(12) United States Patent
Cheng et al.

(10) Patent No.: US 8,727,135 B2
(45) Date of Patent: May 20, 2014

(54) COMPOSITE FILTRATION MEMBRANES AND METHODS OF PREPARATION THEREOF

(75) Inventors: Joy Cheng, San Jose, CA (US); Ratnam Sooriyakumaran, San Jose, CA (US); Ankit Vora, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 12/873,361

(22) Filed: Sep. 1, 2010

(65) Prior Publication Data

US 2012/0048798 A1    Mar. 1, 2012

(51) Int. Cl.
*B01D 39/00* (2006.01)
*B01D 39/14* (2006.01)
*C08L 75/00* (2006.01)
*B01D 67/00* (2006.01)
*B05D 5/00* (2006.01)
*B29C 44/04* (2006.01)

(52) U.S. Cl.
USPC ............ 210/500.35; 210/490; 210/500.27; 525/123; 264/48; 427/244

(58) Field of Classification Search
CPC ...... C08F 8/30; C08F 2438/03; C08F 220/08; C08L 75/00; B01D 69/12; B01D 71/00; B01D 67/00; B01D 39/14; B01D 39/00; B05D 5/00; B05D 3/02; B29C 44/04
USPC .......... 210/500.27, 500.35, 490; 428/319.3, 428/44, 60; 525/123, 107; 264/48; 427/244
See application file for complete search history.

(56) References Cited

U.S. PATENT DOCUMENTS

| 4,554,317 | A |   | 11/1985 | Behar et al. |
| 4,897,091 | A |   | 1/1990 | Pasternak et al. |
| 4,914,064 | A |   | 4/1990 | Schucker |
| 4,931,483 | A |   | 6/1990 | Matsuoka et al. |
| 5,034,330 | A | * | 7/1991 | Yamori et al. ........... 204/403.11 |

(Continued)

FOREIGN PATENT DOCUMENTS

| EP | 0419396 A1 | 3/1991 |
| WO | 9962623 | 12/1999 |

OTHER PUBLICATIONS

Florian, et al., "Preparation and Characterization of Novel Solvent-Resistant Nanofiltration Composite Membranes Based on Crosslinked Polyurethanes," Ind. Eng. Chem. Res., 2007, 46(14), 4891-4899.

(Continued)

*Primary Examiner* — Ana Fortuna
(74) *Attorney, Agent, or Firm* — Michael R. Roberts

(57) ABSTRACT

A composition comprises a crosslinked poly(meth)acrylate comprising two or more poly(meth)acrylate backbones covalently linked to a bridging group, the backbones comprising i) respective first repeat units, each of which comprises a first side chain ester moiety comprising a hydrophilic poly(alkylene oxide) chain segment, ii) respective second repeat units, each of which comprises a second side chain ester moiety directly linked to the bridging group through a linking group selected from the group consisting of carbamate groups, urea groups, and thiocarbamate groups, and iii) respective third repeat units, each of which comprises a hydrophobic side chain moiety not directly linked to any bridging group. Composite filtration membranes having a selective layer that comprises the composition exhibit useful anti-fouling and/or salt rejection characteristics.

34 Claims, 6 Drawing Sheets

(56) References Cited

U.S. PATENT DOCUMENTS

| | | | |
|---|---|---|---|
| 5,169,719 | A | 12/1992 | Balatan |
| 5,578,688 | A | 11/1996 | Ito et al. |
| 5,693,227 | A | 12/1997 | Costa |
| 6,280,853 | B1 | 8/2001 | Mickols |
| 6,346,588 | B1 | 2/2002 | Fenchl et al. |
| 6,632,915 | B1 | 10/2003 | Schwarte et al. |
| 7,553,417 | B2 * | 6/2009 | Waller et al. ............. 210/500.27 |
| 7,585,927 | B2 | 9/2009 | Liu |
| 7,677,398 | B2 | 3/2010 | Belfer et al. |
| 7,815,987 | B2 * | 10/2010 | Mickols et al. ............. 428/36.5 |
| 2003/0121857 | A1 | 7/2003 | Kurth et al. |
| 2003/0124357 | A1 | 7/2003 | Kagerer et al. |
| 2007/0251883 | A1 | 11/2007 | Niu |
| 2008/0071056 | A1 | 3/2008 | Borst |
| 2008/0149561 | A1 | 6/2008 | Chu et al. |
| 2008/0181861 | A1 | 7/2008 | Jiang et al. |
| 2009/0156460 | A1 | 6/2009 | Jiang et al. |
| 2009/0159527 | A1 | 6/2009 | Mickols et al. |
| 2009/0162662 | A1 | 6/2009 | Chang et al. |
| 2009/0197791 | A1 | 8/2009 | Balastre et al. |
| 2009/0266764 | A1 | 10/2009 | Kawakatsu |
| 2010/0093874 | A1 | 4/2010 | Monin et al. |
| 2012/0048798 | A1 * | 3/2012 | Cheng et al. ................... 210/490 |
| 2013/0034609 | A1 * | 2/2013 | Liu et al. ....................... 424/489 |
| 2013/0095054 | A1 * | 4/2013 | Li et al. ........................... 424/61 |

OTHER PUBLICATIONS

Nunes, et al., "Dense hydrophilic composite membranes for ultrafiltration", Journal of Membrane Science 106 (1995) 49-56.

Qiu, et al., "Preparation of Reverse Osmosis Composite Membrane with High Flux by Interfacial Polymerization of MPD and TMC," Journal of Applied Polymer Science, vol. 112, 2066-2072 (2009).

Sagle, et al., "PEG-coated reverse osmosis membranes: Desalination properties and fouling resistance", Journal of Membrane Science, 340, (2009), 92-108.

Sforca, et al., "Composite nanofiltration membranes prepared by in situ polycondensation of amines in a poly(ethylene oxide-b-amide) layer," Journal of Membrane Science 135 (1997) 179-186.

* cited by examiner

COMPOSITE FILTRATION MEMBRANES AND METHODS OF PREPARATION THEREOF

BACKGROUND

The present invention relates to composite filtration membranes, methods of their preparation, and more specifically to crosslinked poly(meth)acrylates for selective layers of composite filtration membranes used in water purification.

Fluid filtration membranes include microfiltration (MF), nanofiltration (NF), reverse osmosis (RO), and ultrafiltration (UF) membranes. Nanofiltration membranes are mainly used for water softening and removal of organic contaminants. Nanofiltration is also used in the food industry for concentration and demineralization of whey, as well as for the concentration of sugar and juice. Nanofiltration membranes are usually fabricated by interfacial polymerization between i) a piperazine or an amine substituted piperidine or cyclohexane and ii) a polyfunctional acyl halide (Dow FILMTEC). Nanofiltration membranes are also made by coating ultrafiltration membranes with different polymer solutions. Nitto Denko has a commercial nanofiltration membrane containing a thin layer of polyvinyl alcohol coated on a porous polysulfone support. Nanofiltration membranes are also obtained by modifying reverse osmosis membranes (RO). In this process, a strong mineral acid such as phosphoric acid is contacted with a crosslinked polyamide layer at 100° C. to 150° C., which is followed by a treatment with a "rejection-enhancing agent" such as tannic acid to selectively plug microscopic leaks and defects.

Although many advances have been made in recent years for making commercial filtration membranes, improved solvent resistance, adhesion, and/or fouling resistance to organic foulants and biofoulants remain significant challenges. To overcome the fouling problem in membranes, several research groups synthesized new poly(ethylene glycol) (PEG) based copolymers, which were shown to be useful as high-flux nanofiltration membranes exhibiting low biofouling. The PEG graft copolymers are not crosslinked and hence adhesion to the support membrane is an issue when used for longer timescales.

Other thin film composite (TFC) nanofiltration (NF) membranes based on poly(vinylidene fluoride)-graft-poly(oxyethylene)methacrylate (PVDF-g-PEOM) have been used as a selective layer for water purification. The poly(oxyethylene) grafts were grown from the poly(vinylidene fluoride) backbone, using fluorine as an initiator for atom transfer radical polymerization (ATRP). Although these materials act as efficient selective layers for thin film composite NF membranes, they are expensive to manufacture. ATRP utilizes a copper-based catalyst, which is removed using several purification steps in the purification of the graft/comb copolymer.

Other polymer systems based on poly(acrylonitrile-graft-ethyleneoxide) PAN-g-PEO have also been used as selective layers for thin film composite NF membranes, but these membranes have to be cast on the UF support membrane by a phase-inversion method. Moreover, the selective layer is a thermoplastic polymer that offers no means of crosslinking to improve the toughness, adhesion and solvent resistance of the separation membranes.

PEO based graft copolymers have also been synthesized by ring opening metathesis polymerization (ROMP) of cyclooctene based monomers. These polymers have phenylazide based moieties that undergo crosslinking in the presence of UV light. A drawback of this system is the synthetic challenge of designing new exotic PEO and phenylazide based cyclooctene based monomers. Another drawback is the explosive nature of the azide functional group, rendering the compounds unsuitable for large scale manufacturing.

Consequently, a need continues for filtration membranes having improved mechanical and/or performance properties, which can be prepared using materials and methods suitable for large scale manufacturing.

SUMMARY

Accordingly, a composition is disclosed, comprising:
a crosslinked poly(meth)acrylate comprising two or more poly(meth)acrylate backbones covalently linked to a bridging group, the backbones comprising i) respective first repeat units, each of which comprises a first side chain ester moiety comprising a hydrophilic poly(alkylene oxide) chain segment, ii) respective second repeat units, each of which comprises a second side chain ester moiety directly linked to the bridging group through a linking group selected from the group consisting of carbamate groups, urea groups, and thiocarbamate groups, and iii) respective third repeat units, each of which comprises a hydrophobic side chain moiety not directly linked to any bridging group.

A method is disclosed, comprising:
applying a chemical and/or physical treatment to a porous support membrane to increase its hydrophilicity;
disposing, on the porous support membrane, a mixture comprising i) a multi-functional isocyanate crosslinking agent comprising two or more isocyanate groups, ii) a solvent, iii) an optional accelerator, and iv) a crosslinkable poly(meth)acrylate, thereby forming an initial film layer, wherein the crosslinkable poly(meth)acrylate comprises a) a first repeat unit comprising a first side chain ester comprising a poly(alkylene oxide) chain segment, b) a second repeat unit comprising a second side chain ester group comprising a nucleophilic group selected from the group consisting of alcohols, amines, thiols, and combinations thereof, wherein the nucleophilic group is capable of reacting with the multi-functional isocyanate crosslinking agent, and c) a third repeat unit comprising a hydrophobic side chain group not capable of reacting with the multi-functional isocyanate crosslinking agent; and
treating the initial film layer thermally, photolytically, chemically, or by a combination thereof, thereby forming a composite filtration membrane comprising a selective layer disposed on the porous support membrane, the selective layer comprising a crosslinked poly(meth)acrylate, the crosslinked poly(meth)acrylate comprising a linking group produced by a reaction of the nucleophilic group with the multi-functional isocyanate crosslinking agent, the linking group selected from the group consisting of carbamates, ureas, thiocarbamates, and combinations thereof.

Also disclosed is a method, comprising:
disposing, on a temporary support, a mixture comprising i) a multi-functional isocyanate crosslinking agent comprising two or more isocyanate groups, ii) a solvent, iii) an optional accelerator, and iv) a crosslinkable poly(meth)acrylate, thereby forming an initial film layer, wherein the crosslinkable poly(meth)acrylate comprises a) a first repeat unit comprising a first side chain ester comprising a poly(alkylene oxide) chain segment, b) a second repeat unit comprising a second side chain ester group comprising a nucleophilic group selected from the group consisting of alcohols, amines, thiols, and combinations thereof, wherein the nucleophilic group is capable of reacting with the multi-functional isocyanate crosslinking agent, and c) a third repeat unit comprising a hydrophobic side chain group not capable of reacting with the multi-functional isocyanate crosslinking agent;

treating the initial film layer thermally, photolytically, chemically, or by a combination of the foregoing techniques, thereby forming a layer of crosslinked poly(meth)acrylate comprising a linking group produced by reaction of the nucleophilic group with the multi-functional isocyanate crosslinking agent, the linking group selected from the group consisting of carbamates, ureas, thiocarbamates, and combinations thereof;

optionally removing solvent, if present, from the layer of crosslinked poly(meth)acrylate; and separating the layer of crosslinked poly(meth)acrylate from the temporary support, thereby providing a self-supporting selective layer for fluid filtration.

Also disclosed is a composite filtration membrane, comprising:

a porous support membrane; and a selective layer comprising a crosslinked poly(meth)acrylate disposed on one or more faces of the porous support membrane, the crosslinked poly(meth)acrylate comprising two or more poly(meth)acrylate backbones covalently linked to a bridging group, the backbones comprising i) respective first repeat units, each of which comprises a first side chain ester moiety comprising a hydrophilic poly(alkylene oxide) chain segment, ii) respective second repeat units, each of which comprises a second side chain ester moiety directly linked to the bridging group through a linking group selected from the group consisting of carbamate groups, urea groups, and thiocarbamate groups, and iii) respective third repeat units, each of which comprises a hydrophobic side chain moiety not directly linked to any bridging group.

A composition is disclosed, comprising:

a crosslinked poly(meth)acrylate comprising two or more poly(meth)acrylate backbones; wherein each of the two or more backbones is connected to i) a crosslinked ester side chain moiety, the crosslinked ester side chain moiety being covalently linked to a bridging group by a linking group selected from the group consisting of carbamate groups, urea groups, and thiocarbamate groups, ii) a hydrophilic side chain ester moiety comprising a poly(alkylene oxide) chain segment, and iii) a hydrophobic side chain moiety not directly linked to any bridging group.

The above-described and other features and advantages of the present invention will be appreciated and understood by those skilled in the art from the following detailed description, drawings, and appended claims.

BRIEF DESCRIPTION OF THE SEVERAL VIEWS OF THE DRAWINGS

In the drawings, like parts are numbered alike.

DETAILED DESCRIPTION

The invention is based on compositions comprising crosslinked poly(meth)acrylates for fluid purification. As defined herein, a fluid can be a liquid or a gas. The crosslinked poly(meth)acrylates are prepared by treating a crosslinkable poly(meth)acrylate with a multi-functional isocyanate crosslinking agent. The disclosed crosslinked poly(meth) acrylates can have water permeability properties suitable for purifying an aqueous mixture. Also disclosed are composite filtration membranes for water purification comprising i) a porous support membrane, and ii) a selective layer comprising a water permeable crosslinked poly(meth)acrylate disposed on at least one surface of the porous support membrane. The composite filtration membranes have enhanced antifouling resistance and/or enhanced salt rejection properties compared to the porous support membrane alone. The porous support membrane can be a microfiltration (MF) membrane, ultrafiltration (UF) membrane, nanofiltration (NF) membrane, or reverse osmosis (RO) support membrane.

Figure 1:
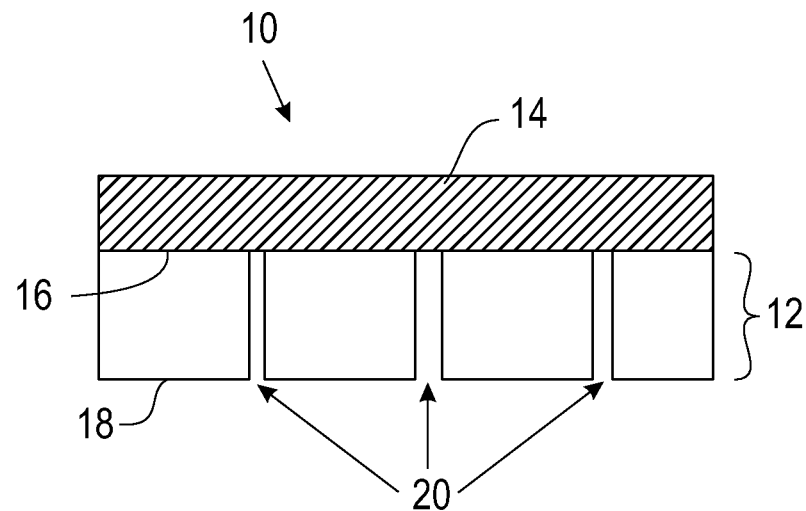
FIG. 1 is a cross-sectional layer diagram of a composite filtration membrane having a contiguous selective layer disposed on a porous support membrane.
Figure 2:
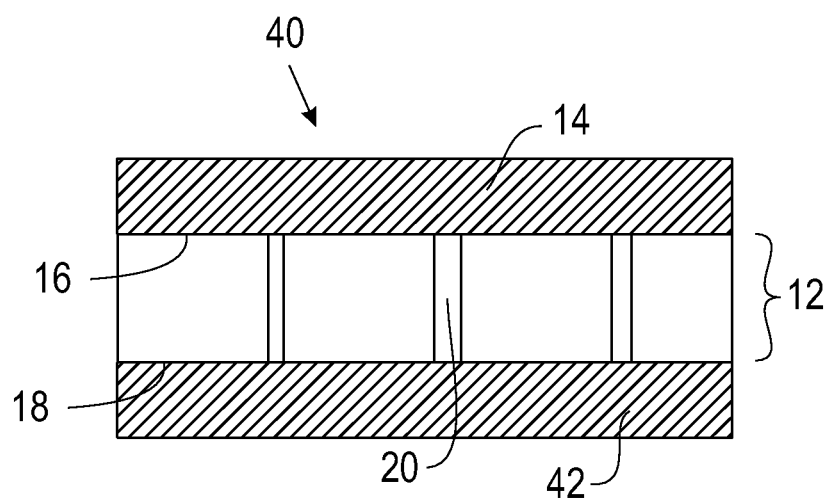
FIG. 2 is a cross-sectional layer diagram of a composite filtration membrane having two contiguous selective layers disposed on different faces of a porous support membrane.

Two embodiments of the composite filtration membrane are depicted in the cross-sectional layer diagrams of FIGS. 1 and 2.

In FIG. 1, composite filtration membrane 10 comprises porous support membrane 12 having top surface 16, bottom surface 18, pores 20, and crosslinked selective layer 14 disposed on top surface 16. Porous support membrane 12 can comprise one or more additional layers. Selective layer 14 can be covalently bonded to porous support membrane 12 or adhere to porous support membrane 12 through non-covalent interactions. Alternatively, selective layer 14 can have minimal or no adhering contact with porous support membrane 12, meaning little or no force is required to physically separate the two layers. As shown in FIG. 1, selective layer 14 does not substantially occupy pores 20.

In another embodiment, as shown in the cross-sectional layer diagram of FIG. 2, composite filtration membrane structure 40 comprises first selective layer 14 disposed substantially on top surface 16 of porous support membrane 12, and a second selective layer 44 substantially disposed on bottom surface 18 of porous support membrane 12. Selective layers 14 and/or 44 do not substantially occupy pores 20.

The term "(meth)acrylate" indicates an acrylate or a methacrylate monomer. The term "poly(meth)acrylate" refers to a polymer made from one or more acrylate monomers, one or more methacrylate monomers, or combinations thereof. Herein, the crosslinkable poly(meth)acrylate can comprise additional repeat units derived from a polymerizable monomer other than a (meth)acrylate monomer, such as styrene. A crosslinked poly(meth)acrylate herein means one or more side chain moieties of each of two or more poly(meth)acrylate backbones are covalently linked through linking groups to a bridging group derived from a crosslinking agent. A linking group is formed in a reaction of a side chain nucleophilic group of the crosslinkable poly(meth)acrylate with an isocyanate group of the crosslinking agent.

The crosslinkable poly(meth)acrylate can be a random copolymer or a block copolymer. The block copolymer can comprise a block comprising a homopolymer or random copolymer chain segment. The number average molecular weight $M_n$ of the crosslinkable poly(meth)acrylate can be 1000 to 1,000,000 g/mol, more particularly 1000 to 100,000 g/mol, and even more particularly 1000 to 50,000 g/mole.

The crosslinkable poly(meth)acrylate comprises a) a first repeat unit comprising a first side chain ester comprising a poly(alkylene oxide) chain segment, b) a second repeat unit comprising a second side chain ester group comprising a nucleophilic group selected from the group consisting of alcohols, amines, thiols, and combinations thereof, wherein the nucleophilic group is capable of reacting with the multi-functional isocyanate crosslinking agent, and c) a third repeat unit comprising a hydrophobic side chain group not capable of reacting with the multi-functional isocyanate crosslinking agent. The first repeat units are derived from one or more (meth)acrylate monomers comprising a hydrophilic poly(alkylene oxide) side chain group. The second repeat units are derived from one or more (meth)acrylate monomers comprising a nucleophilic side chain group selected from the group consisting of alcohols, amines, thiols, and combinations thereof. The third repeat units are derived from one or more hydrophobic vinyl polymerizable monomers that do not react with an isocyanate crosslinking agent.

The nucleophilic side chain group of the second repeat unit forms a covalent bond in a reaction with a multi-functional monomeric or polymeric isocyanate crosslinking agent.

The poly(alkylene oxide) side chain group of the first repeat unit can optionally also comprise a nucleophilic end group selected from the group consisting of alcohols, amines, thiols, and combinations thereof, which is capable of reacting with an isocyanate crosslinking agent.

The crosslinkable poly(meth)acrylate is prepared by polymerizing in the presence of a polymerization initiator, a hydrophilic first (meth)acrylate monomer whose ester moiety comprises a poly(alkylene oxide) chain segment, a second (meth)acrylate monomer whose ester moiety comprises a nucleophilic alcohol, amine, or thiol group capable of reacting with an isocyanate crosslinking agent, and a hydrophobic third vinyl polymerizable monomer. When present, nucleophilic amine groups are generally used in the form a protonated salt, such as an ammonium halide salt.

The hydrophilic first (meth)acrylate monomer has the general formula (1):

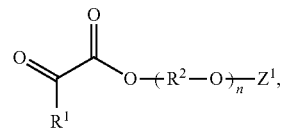

wherein
—$R^1$ is a hydrogen or a methyl group,
—$R^2$— is a divalent radical selected from the group consisting of a ethylene, 2-propylene, butylene, and combinations thereof,
n is a positive integer greater than 1, and
—$Z^1$ is a monovalent radical selected from the group consisting of —H, —$R^3$, -$L^1$-$NH_2$, -$L^1$-N(H)$R^3$, -$L^1$-N($R^3$)$_2$, -$L^1$-SH, and -$L^1$-S$R^3$, wherein —$R^3$ is monovalent radical comprising 1 to 20 carbons, and -$L^1$ is a divalent radical comprising 1 to 20 carbons.

The first (meth)acrylate monomer can have a poly(ethylene oxide) chain segment, polypropylene oxide) chain segment, poly(butylene oxide) chain segment, or a combinations thereof (e.g., a poly(ethylene oxide-co-propylene oxide) copolymer chain segment). The co-poly(alkylene oxide) chain segment can be a block copolymer or a random copolymer segment. As indicated above in the definition of $Z^1$, the terminal end group of the poly(alkylene oxide) chain segment can comprise an alcohol, amine, or thiol nucleophilic group capable of reacting with the isocyanate crosslinking agent. Alternatively, the terminal end group of the poly(alkylene oxide) chain segment can be capped as a non-reactive alkyl ether such as commercially available poly(ethylene glycol) methyl ether methacrylate (MPEGMA). The poly(alkylene oxide) chain segment comprises at least two alkylene oxide repeat units, more particularly 3 to 100 alkylene oxide repeat units (i.e., n is a positive integer from 3 to 100 in formula (1)). In an embodiment, the poly(alkylene oxide) chain is a poly(ethylene oxide) chain segment, and n is a positive integer from 5 to 15.

Non-limiting examples of first (meth)acrylate monomers comprising a poly(alkylene oxide) chain segment include the monomers of Table 1.

TABLE 1

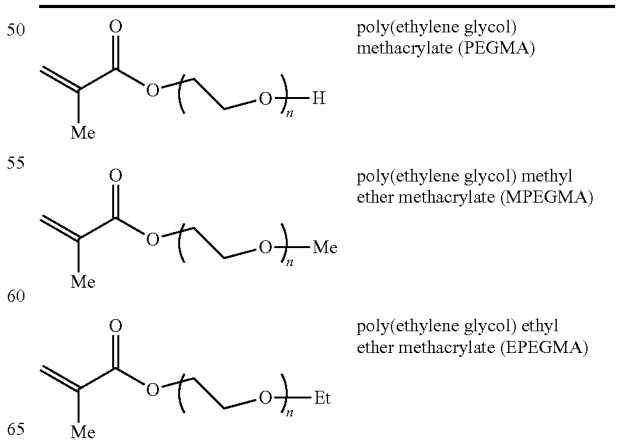

poly(ethylene glycol) methacrylate (PEGMA)

poly(ethylene glycol) methyl ether methacrylate (MPEGMA)

poly(ethylene glycol) ethyl ether methacrylate (EPEGMA)

TABLE 1-continued

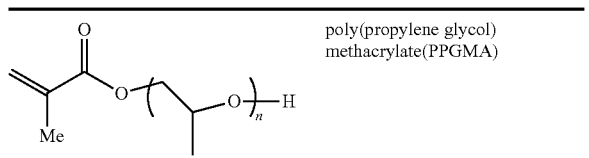

poly(propylene glycol) methacrylate(PPGMA)

The second (meth)acrylate monomer has the general formula (2):

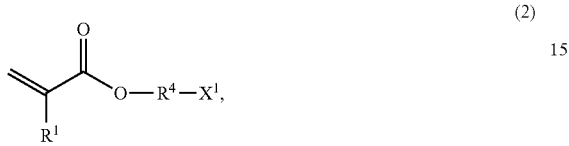

(2)

wherein
—$R^1$ is a hydrogen or a methyl group,
—$R^4$— is a linear, branched or cyclic divalent radical selected from the group consisting of alkylenes, fluoroalkylenes, arylenes, arylalkylenes, alkylarylenes, and silicon containing groups, and
—$X^1$ is a monovalent nucleophilic radical selected from the group consisting of —OH, —$NH_2$, —N(H)$R^5$, —SH, and protonated salt forms of any of the foregoing groups, wherein —$R^5$ is monovalent radical comprising 1 to 20 carbons, and —$X^1$ is capable of reacting with a multi-functional isocyanate crosslinking agent to form a covalent bond.

Exemplary second (meth)acrylate monomers include:

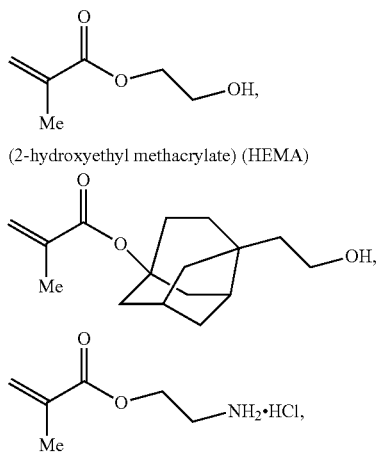

(2-hydroxyethyl methacrylate) (HEMA)

(2-aminoethyl methacrylate hydrochloride salt)(AEMA—HCL)

2-hydroxyethyl acrylate,
2-hydroxypropyl(meth)acrylate,
3-chloro-2-hydroxypropyl(meth)acrylate,
3-hydroxypropyl(meth)acrylate,
2,3-dihydroxypropyl mono(meth)acrylate,
4-hydroxybutyl(meth)acrylate,
trimethylolpropane mono(meth)acrylate
2-thioethyl(meth)acrylate,
2-thiopropyl(meth)acrylate,
3-thiopropyl(meth)acrylate,
2,3-dithiopropyl(meth)acrylate,
4-thiobutyl(meth)acrylate,
3-amino-1-propyl(meth)acrylate,
5-amino-1-pentyl(meth)acrylate,
6-amino-1-hexyl(meth)acrylate, and
11-amino-1-undecyl(meth)acrylate.

The third monomer can be a (meth)acrylate monomer or another polymerizable vinyl monomer, for example a styrene, (meth)acrylamide, vinyl alkyl ether, halogenated alkyl vinyl ether, vinyl alkyl ketone, butadiene, isoprene, chloroprene, maleic anhydride, and N-vinyl carbazole. The third monomer has the general formula (3):

(3)

wherein
—$R^1$ is a hydrogen or a methyl group, and
—$W^1$ is a monovalent radical comprising two or more carbons.

In an embodiment, the third monomer is a (meth)acrylate of general formula (4):

(4)

wherein
—$R^1$ is a hydrogen or a methyl group, and
—$R^6$ is a monovalent radical comprising one or more carbons.

Exemplary third monomers include methyl methacrylate (MMA), methyl acrylate (MA), benzyl (meth)acrylate, cyclohexyl (meth)acrylate, and 2-ethylhexyl (meth)acrylate.

Generally, the tuning of film-forming properties, cross-link density, water permeability, and anti-fouling behavior can be accomplished with greatest design flexibility by employing the three above-described monomer components in the preparation of the crosslinkable poly(meth)acrylate. Also contemplated are crosslinkable poly(meth)acrylates comprising two of the above-described monomer groups, wherein the third vinyl polymerizable monomer is optional. In this instance, the second (meth)acrylate monomer provides a combination of hydrophobicity and crosslinkability to balance the hydrophilic first (meth)acrylate monomer. Thus, the crosslinkable poly(meth)acrylate comprises first repeat units derived from one or more (meth)acrylate monomers comprising a hydrophilic poly(alkylene oxide) side chain group, and a second repeat unit derived from one or more (meth)acrylate monomers comprising a hydrophobic side chain group, the side chain group comprising a nucleophilic group selected from the group consisting of alcohols, amines, thiols, and combinations thereof capable of reacting with an isocyanate crosslinking agent.

The crosslinkable poly(meth)acrylate can be prepared using various known methods and conditions for the polymerization of (meth)acrylate monomers, including but not limited to solution polymerization (batch-wise or sequential addition to generate random copolymers or block copolymers, respectively), suspension polymerization, and emulsion polymerization. Exemplary polymerization initiators include organic peroxides, azo compounds, persulfates, photoinitiators, and ionized radiation such as γ-rays. The polymerization is conducted at a temperature of 20° C. to 100° C., more particularly 40° C. to 90° C.

The crosslinkable poly(meth)acrylate can comprise first repeat units derived from the first (meth)acrylate monomer preferably in an amount of about 40 wt. % to about 70 wt. %, second repeat units derived from the second (meth)acrylate monomer preferably in an amount of about 6 wt. % to about 20 wt. %, and third repeat units derived from the third vinyl polymerizable monomer preferably in an amount of about 54 wt. % to about 10 wt. %, wherein weight percent (wt. %) is based on total weight of the monomers used to make the crosslinkable poly(meth)acrylate.

In a specific example, the crosslinkable poly(meth)acrylate comprises a copolymer of poly(ethylene glycol) methyl ether methacrylate (MPEGMA) (corresponding to the first (meth) acrylate monomer, 2-hydroxyethyl methacrylate (HEMA) (corresponding to the second (meth)acrylate monomer), and methyl methacrylate (MMA) (corresponding to the third vinyl monomer). In another embodiment, the first repeat unit derived from MPEGMA is present preferably in an amount of about 40 wt. % to about 70 wt. %, the second repeat unit derived from HEMA is present preferably in an amount of about 6 wt. % to about 20 wt. %, and the third repeat unit derived from MMA is present preferably in an amount of about 54 wt. % to about 10 wt. %, each based on total weight of monomers used to make the crosslinkable poly(meth)acrylate. In an embodiment, the crosslinkable poly(meth)acrylate comprises second repeat units derived from HEMA in an amount of about 10 wt. % to about 20 wt. %, and first repeat units derived from MPEGMA in an amount of about 40 wt. % to about 70 wt. %, each based on the total weight of monomers used to make the crosslinkable poly(meth)acrylate. In more specific examples, the crosslinkable poly(meth)acrylate can be prepared using a MMA:HEMA:MPEGMA weight ratio of 23:12:65, 33:16:51, 23:12:65, 50:10:40, 30:10:60, 28:5:67, or 20:20:60, based on 100 parts of the combined three monomers, with a MMA:HEMA:MPEGMA weight ratio of about 33:16:51 being preferred.

In mole percents, the crosslinkable poly(meth)acrylate can comprise first repeat units derived from the first (meth)acrylate monomer preferably in an amount of about 4 mol % to about 31 mol %, second repeat units derived from the second (meth)acrylate monomer preferably in an amount of about 9 mol % to about 32 mol %, and third repeat units derived from the third vinyl polymerizable monomer preferably in an amount of about 87 mol % to about 37 mol %, each based on total moles of the monomers used to make the crosslinkable poly(meth)acrylate. In a specific example, the crosslinkable poly(meth)acrylate can comprise a copolymer of MPEGMA, HEMA, and MMA, wherein the first repeat unit derived from MPEGMA is present in an amount of about 13 mol % to about 31 mol %, the second repeat unit derived from HEMA is present in an amount of about 12 mol % to about 32 mol %, and the third repeat unit derived from MMA is present in an amount of about 75 mol % to about 37 mol %, each based on total moles of monomers used to make the crosslinkable poly(meth)acrylate. In more specific examples, the crosslinkable poly(meth)acrylate can be prepared using a MMA:HEMA:MPEGMA mole ratio of 49:20:31, 58:22:20, 75:12:13, 59:15:26, or 41:32:27, based on 100 moles of the three monomers used to make the crosslinkable poly(meth)acrylate, with a MMA:HEMA:MPEGMA mole ratio of 58:22:20 being preferred.

The crosslinkable poly(meth)acrylates have the general formula (5):

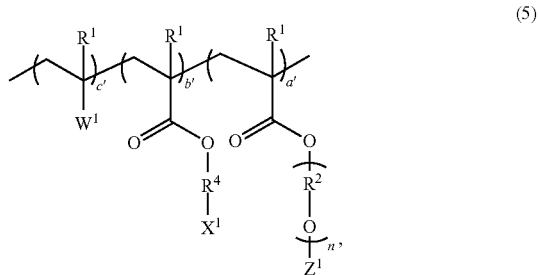

wherein
a', b', and c' are positive numbers,
each —$R^1$ is independently a hydrogen or methyl group,
—$R^2$— is a divalent radical selected from the group consisting of ethylene, 2-propylene, butylene, and combinations thereof,
n is a positive integer greater than 1, and
—$Z^1$ is a monovalent radical selected from the group consisting of —H, —$R^3$, -$L^1$-OH, -$L^1$-$NH_2$, -$L^1$-N(H)$R^3$, -$L^1$-N($R^3$)$_2$, -$L^1$-SH, and -$L^1$-$SR^3$, wherein each —$R^3$ is a monovalent radical comprising 1 to 20 carbons,
-$L^1$- is a divalent linking group comprising 1 to 20 carbons,
—$R^4$— is a linear, branched or cyclic divalent radical selected from the group consisting of alkylenes, fluoroalkylenes, arylenes, arylalkylenes, alkylarylenes, and silicon containing groups,
—$X^1$ is a nucleophilic monovalent radical selected from the group consisting of —OH, —$NH_2$, —N(H)$R^5$, and —SH, wherein —$R^5$ is a monovalent radical comprising 1 to 20 carbons, wherein —$X^1$ is capable of reacting with the multifunctional isocyanate crosslinking agent to form a covalent bond, and
—$W^1$ is a monovalent radical comprising two or more carbons.

In an embodiment, —W' is —$CO_2R^6$, wherein —$R^6$ is a linear, branched or cyclic monovalent radical selected from the group consisting of alkylenes, fluoroalkylenes, arylenes, arylalkylenes, alkylarylenes, and silicon containing groups, and —$R^6$ is not capable of reaction with an isocyanate.

More specifically, the crosslinkable poly(meth)acrylates can have the general formula (6):

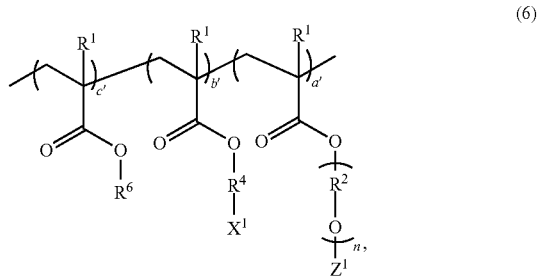

wherein
a', b', and c' are positive numbers,
each —$R^1$ is independently a hydrogen or methyl group,
—$R^2$— is a divalent radical selected from the group consisting of ethylene, 2-propylene, butylene, and combinations thereof, n is a positive integer greater than 1, and —$Z^1$ is a monovalent radical selected from the group consisting of —H, —$R^3$, -$L^1$-OH, -$L^1$-NH$_2$, -$L^1$-N(H)$R^3$, -$L^1$-N($R^3$)$_2$, -$L^1$-SH, and -$L^1$-S$R^3$, wherein —$R^3$ is a monovalent hydrocarbon radical comprising 1 to 20 carbons, -$L^1$- is a divalent linking group comprising 1 to 20 carbons, —$R^4$— is a linear, branched or cyclic divalent radical selected from the group consisting of alkylenes, fluoroalkylenes, arylenes, arylalkylenes, alkylarylenes, and silicon containing groups, $X^1$ is a nucleophilic monovalent radical selected from the group consisting of —OH, —NH$_2$, —N(H)$R^5$, and —SH, wherein —$R^5$ is a monovalent radical comprising 1 to 20 carbons, and —$X^1$ is capable of reacting with a multi-functional isocyanate crosslinking agent to form a covalent bond, and —$R^6$ is a linear, branched or cyclic monovalent radical selected from the group consisting of alkylenes, fluoroalkylenes, arylenes, arylalkylenes, alkylarylenes, and silicon containing groups, wherein —$R^6$ is not capable of reaction with an isocyanate.

In formula (5) and formula (6), when a', b', and c' represent weight percents, a' is preferably about 40 wt. % to about 70 wt. %, b' is preferably about 6 wt. % to about 20 wt. %, and c' is preferably about 54 wt. % to about 10 wt. %, each based on total weight of the crosslinkable polymer.

In formula (5) and formula (6), when a', b', and c' represent mole percents, a' is preferably about 4 mol % to about 31 mol %, b' is preferably about 9 mol % to about 32 mol %, and c' is preferably about 87 mol % to about 37 mol %, based on a total of 100 mole percent of polymerizable monomers used in making the crosslinkable poly(meth)acrylate.

The crosslinkable poly(meth)acrylate can optionally comprise, in addition to the first, second and third repeat units described above, additional repeat units derived from one or more additional polymerizable monomers. In these instances, the crosslinkable poly(meth)acrylate comprises more than 0 wt. % and less than about 10 wt. % of the additional repeat units based on total weight of the polymer. In an embodiment, the first, second, and third repeat units together comprise 90 wt. % or more, more particularly 95 wt. % or more, and most particularly 98 wt. % or more of the total weight of the crosslinkable poly(meth)acrylate.

The multi-functional isocyanate crosslinking agent has the general formula (7):

$$R^7 \mhyphen (NCO)_m \qquad (7),$$

wherein m is an integer greater than or equal to 2, and $R^7$ represents a core structure of the crosslinking agent, having a valency of m and comprising from 1 to 10,000 carbons.

The multi-functional crosslinking agent can be a monomeric aromatic diisocyanate, aliphatic diisocyanate, alicyclic diisocyanate, or a combination of thereof. Exemplary monomeric aromatic diisocyanates include 1,3-phenylene diisocyanate, 4,4'-diphenylmethane diisocyanate (MDI), toluene diisocyanate (TDI), 1-chloromethyl-2,4-diisocyanatobenzene, 2,4,6-trimethyl-1,3-phenylene diisocyanate, 4,4'-methylenebis(2,6-diethylphenyl isocyanate), 4,4'-methylenebis(2-chlorophenyl isocyanate), and tolidine diisocyanate (TODI).

Exemplary monomeric aliphatic diisocyanates include hexamethylene diisocyanate (HDI), uretidone dimer of HDI, trimethyl-1,6-diisocyanatohexane, 1,12-diisocyanato do de cane, 1,3-bis(isocyanatomethyl)cyclohexane, 1,3-bis(1-isocyanato-1-methylethyl)benzene, 1,4-diisocyanatobutane, 1,5-diisocyanato-2-methylpentane, 1,6-diisocyanatohexane, 1,8-diisocyanatooctane, and lysine diisocyanate. Exemplary monomeric alicyclic diisocyanatesinclude isophorone diisocyanate (IPDI), 4,4'-dicyclohexylmethane diisocyanate (hydrogenated MDI), cyclohexylene diisocyanate, and bis(isocyanate methyl)cyclohexane.

More particularly, the crosslinking agent can be a water insoluble or water dispersible polyisocyanate. A polyisocyanate as used herein, refers to an isocyanate material comprising 3 or more isocyanate groups. Exemplary water insoluble polyisocyanates include materials sold under the trade name DESMODUR N (based on HDI), DESOMDUR L (based on TDI), and DESMODUR Z (based on IPDI), sold by Bayer Aktiengesellschaft, Germany. Water dispersible polyisocyanates are sold under the trade name BAYHYDUR (based on HDI and TDI), also a trademark of Bayer Aktiengesellschaft, Germany. Table 2 lists more specific examples of DESMODUR and BAYHYDUR polyisocyanates. It should be understood that the commercial products of Table 2 contain mixtures of materials.

TABLE 2

| | |
|---|---|
| 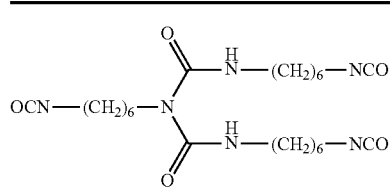 | DESMODUR N-75, DESMODUR N-100, and DESMODUR N-3200 Biuret trimer of HDI |
| 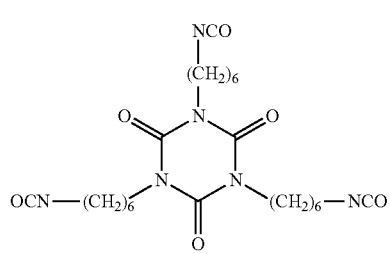 | DESMODUR N-3300, DESMODUR N-3390 DESMODUR N-3600, and DESMODUR N-3790 Symmetric Isocyanurate trimer of HDI |

TABLE 2-continued
| Structure | Description |
|---|---|
| 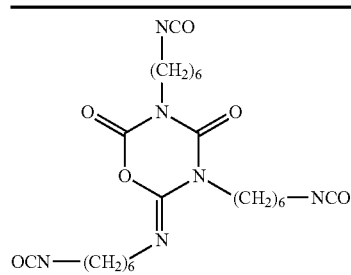 | Asymmetric Isocyanurate trimer of HDI |
| 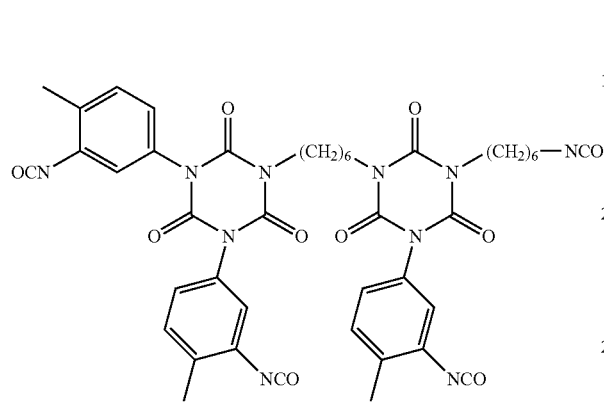 | DESMODUR HL<br>Copolymer Of TDI and HDI |
| 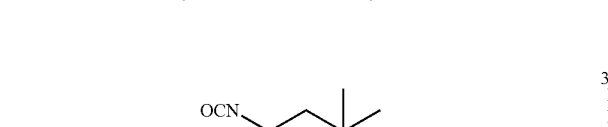 | DESMODUR Z-4470<br>Isocyanurate trimers based on IPDI |
| 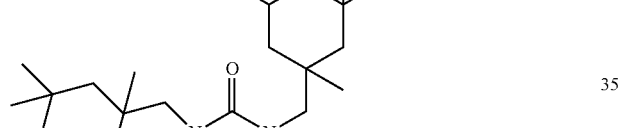 | BAYHYDUR VP LS 2319, and BAYHYDUR VP LS 2336<br>Hydrophylically modified polyisocyanates based on HDI and IPDI.<br>—$R^8$ and —$R^9$ are monovalent radicals comprising one or more carbons. |

The multi-functional crosslinking agent can also comprise a combination of isocyanate crosslinking agents selected from the above diisocyanates and polyisocyanates.

The crosslinked poly(meth)acrylate comprises one or more covalently linked poly(meth)acrylate backbones, meaning each backbone comprises one or more repeat units comprising a side chain ester moiety that is directly covalently linked to one or more bridging groups by a linking group selected the group consisting of carbamate groups, urea groups, and thiocarbamate groups. The bridging groups comprise the core structure, $R^7$, derived from the multi-functional crosslinking agent. "Directly linked" means the side chain ester moiety is covalently linked to the bridging group through the linking group formed by the crosslink reaction. "Indirectly linked" means the side chain moiety is covalently bonded to a bridging group only through the poly(meth)acrylate backbone.

More particularly, each of the crosslinked poly(meth)acrylate backbones comprise a first repeat unit comprising a hydrophilic side chain ester (i.e., —$CO_2R$) moiety comprising a poly(alkylene oxide) chain segment; a second repeat unit comprising crosslinked side chain ester moiety linked to one or more bridging groups by a linking group selected from the group consisting of carbamate groups, urea groups, and thiocarbamate groups; and a third repeat unit comprising a hydrophobic third side chain moiety not linked to any bridging group. The hydrophilic side chain ester moiety can optionally also be crosslinked, covalently linked to one or more bridging groups through a linking group selected from the group consisting of carbamate groups, urea groups, and thiocarbamate groups. In an embodiment, the bridging group is directly linked only to second side chain ester moieties derived from the (meth)acrylate monomer comprising a nucleophilic alcohol, amine and/or thiol group (i.e., no hydrophilic first side chain ester moiety or hydrophobic third side chain moiety is directly covalently linked to any bridging group). In another embodiment, each bridging group is directly linked to three or more side chain ester moieties. In another embodiment, the poly(alkylene oxide) chain segment of the first side chain ester moiety has a degree of polymerization of 5 to 15, more particularly a degree of polymerization of 9 to 11.

In another embodiment, the crosslinked poly(meth)acrylate comprises two or more covalently linked poly(meth)acrylate backbones, wherein each of the two or more backbones is connected to i) a crosslinked ester side chain moiety, the crosslinked ester side chain moiety being covalently linked to a bridging group by a linking group selected from the group consisting of carbamate groups, urea groups, and thiocarbamate groups, ii) a hydrophilic side chain ester moiety comprising a poly(alkylene oxide) chain segment, and iii) a hydrophobic side chain moiety not directly linked to any bridging group.

The crosslinked poly(meth)acrylate can have the general formula (8):

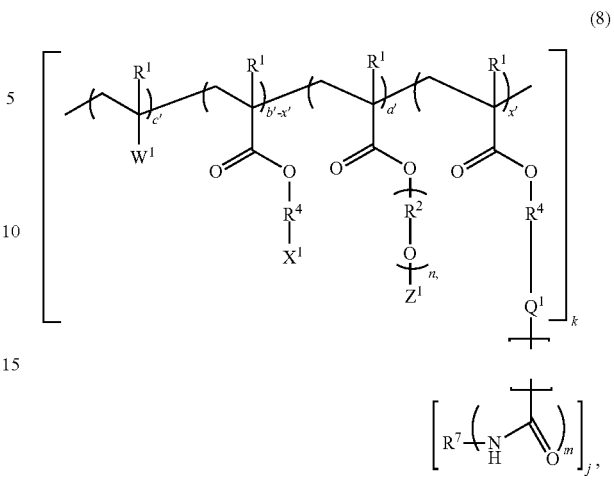

wherein
n is a positive integer greater than 1,
m is a positive integer greater than or equal to 2,
a', b', and c' are positive numbers,
j represents an average number of bridging groups bound to one poly(meth)acrylate chain, j being greater than or equal to 1,
k represents an average number of poly(meth)acrylate chains bound to one bridging group, k being greater than or equal to 1,
x' is a positive number less than or equal to b',
each —$R^1$ is independently a hydrogen or methyl group,
—$R^2$— is a divalent radical selected from the group consisting of ethylene, 2-propylene, butylene, and combinations thereof,
—$R^4$— is a linear, branched or cyclic divalent radical selected from the group consisting of alkylenes, fluoroalkylenes, arylenes, arylalkylenes, alkylarylenes, and silicon containing groups,
—$W^1$ is a monovalent radical comprising two or more carbons,
$R^7$ is a bridging group having a valency of m and comprising 1 to 10,000 carbons,
—N(H)C(=O)-$Q^1$- is a divalent linking group selected from the group consisting of carbamates, ureas, and thiocarbamates,
—$Z^1$ is a monovalent radical selected from the group consisting of —H, —$R^3$, -$L^1$-OH, -$L^1$—$NH_2$, -$L^1$-N(H)$R^3$, -$L^1$-N($R^3$)$_2$, -$L^1$-SH, and -$L^1$-S$R^3$, wherein —$R^3$ is a monovalent radical comprising 1 to 20 carbons,
-$L^1$- is a divalent radical comprising 1 to 20 carbons,
-$Q^1$- is a divalent radical selected from the group consisting of —O—, —N(H)—, —N($R^5$)—, and —S—, wherein —$R^5$ is a monovalent radical comprising 1 to 20 carbons, and
—$X^1$ is a nucleophilic monovalent radical selected from the group consisting of —OH, —$NH_2$, —N(H)$R^5$, and —SH.

In an embodiment, —$R^2$— is ethylene, —$Z^1$ is methyl, —$X^1$ is hydroxyl, -$Q^1$- is —O—, x'=b', and m is 3 or more. In another embodiment, W' is —$CO_2R^6$, wherein —$R^6$ is a linear, branched or cyclic monvalent radical selected from the group consisting of alkylenes, fluoroalkylenes, arylenes, arylalkylenes, alkylarylenes, and silicon containing groups.

Crosslinking can also occur through the hydrophilic first repeat unit comprising the poly(alkylene oxide) repeat unit. In this case the crosslinked poly(meth)acrylate has the general formula (9):

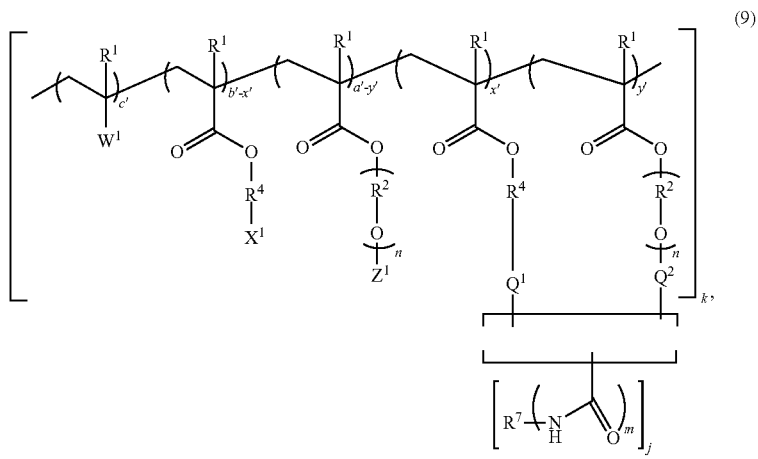

wherein n is a positive integer greater than 1, a', b', and c' are positive numbers, m is a positive integer greater than or equal to 2, j represents the average number of bridging groups bound to one poly(meth)acrylate chain, j being greater than or equal to 1, k represents the average number of poly(meth)acrylate chains bound to one bridging group, k being greater than or equal to 1, y' is a positive number less than or equal to a', x' is a positive number less than or equal to b', each $-R^1$ is independently a hydrogen or methyl group, $-R^2-$ is a divalent radical selected from the group consisting of ethylene, 2-propylene, butylene, and combinations thereof, $-R^4-$ is a linear, branched or cyclic divalent radical selected from the group consisting of alkylenes, fluoroalkylenes, arylenes, arylalkylenes, alkylarylenes, and silicon containing groups, $R^7$ is a bridging group having a valency of m and comprising 1 to 10,000 carbons, $-W^1$ is a monovalent radical comprising two or more carbons, $-N(H)C(=O)-Q^1-$ is a divalent linking group selected from the group consisting of carbamates, ureas, and thiocarbamates, $-Q^1-$ is a divalent radical selected from the group consisting of $-O-$, $-N(H)-$, $-N(R^5)-$, and $-S-$, $-N(H)C(=O)-Q^2-$ is a divalent linking group selected from the group consisting of carbamates, ureas, and thiocarbamates, $-Q^2-$ is a divalent radical selected from the group consisting of $-O-$, $-NH-$, $-N(R^3)-$, $-S-$, $-L^1-O-*$, $-L^1-NH-*$, $-L^1-N(R^3)-*$, and $-L^1-S-*$ wherein the starred bond represents the point of attachment to a carbonyl of a linking group, $-Z^1$ is a monovalent radical selected from the group consisting of $-H$, $-R^3$, $-L^1-OH$, $-L^1-NH_2$, $-L^1-N(H)R^3$, $-L^1-N(R^3)_2$, $-L^1-SH$, and $-L^1-SR^3$, $-R^3$ is a monovalent radical comprising 1 to 20 carbons, $-L^1-$ is a divalent radical comprising 1 to 20 carbons, $-X^1$ is a monovalent nucleophilic monovalent radical selected from the group consisting of $-OH$, $-NH_2$, $-N(H)R^5$, and $-SH$, and $-R^5$ is a monovalent radical comprising 1 to 20 carbons.

In formula (9), $-CO_2(R^2-O)_n-$ is a first side chain ester moiety, $-CO_2(R^4)-$ is a second side chain ester moiety, and $W'$ is a third side chain moiety.

$R^7$ represents a core structure of the crosslinking agent. In an embodiment, $R^7$ is selected from the group consisting of

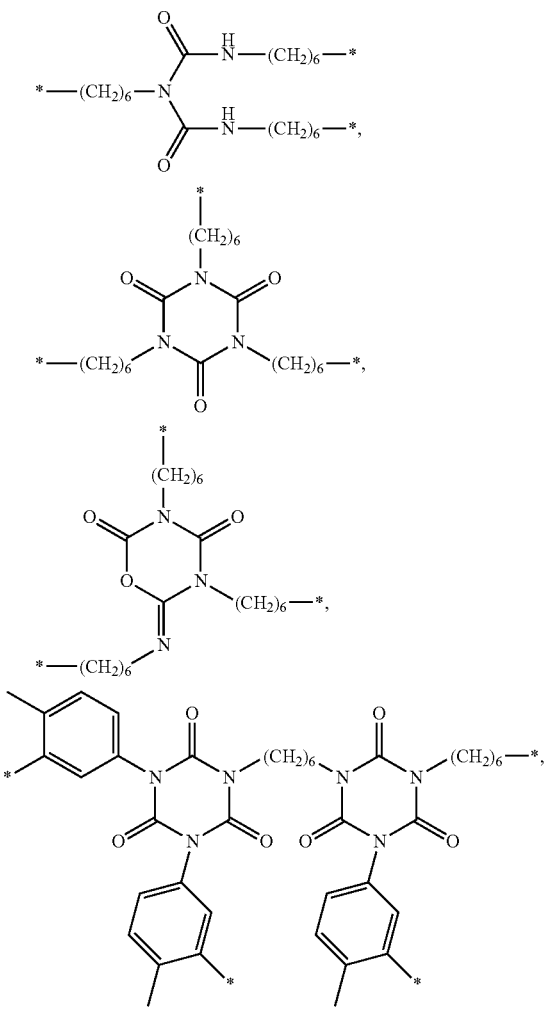

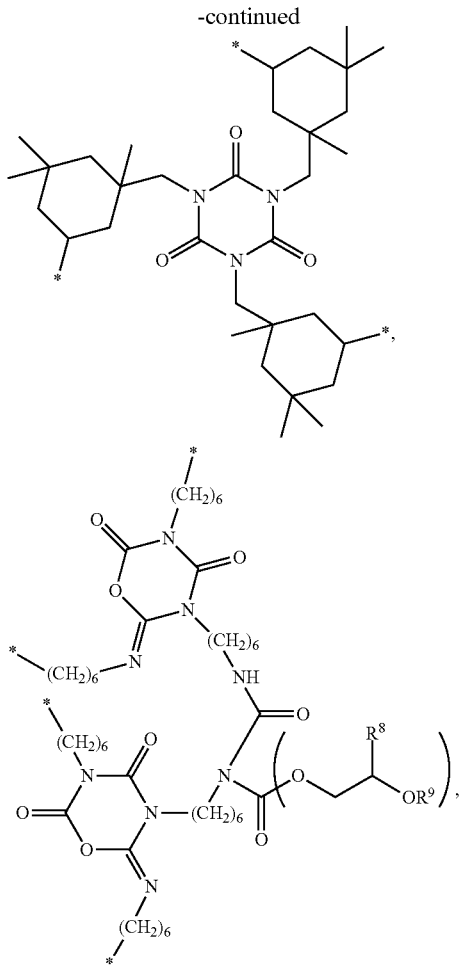

and combinations thereof, wherein —$R^8$ and —$R^9$ are monovalent radicals comprising one or more carbons. The starred bond represents the point of attachment of the core structure $R^7$ to a linking group represented by —N(H)C(=O)-$Q^1$- or —N(H)C(=O)-$Q^2$-.

A method of preparing a composite filtration membrane comprises:

applying a chemical and/or physical treatment to a porous support membrane to increase its hydrophilicity, disposing, on the porous support membrane, a mixture comprising i) a multi-functional isocyanate crosslinking agent comprising two or more isocyanate groups, ii) a solvent, iii) an optional accelerator, and iv) a crosslinkable poly(meth)acrylate, thereby forming an initial film layer, wherein the crosslinkable poly(meth)acrylate comprises a) a first repeat unit comprising a first side chain ester comprising a poly(alkylene oxide) chain segment, b) a second repeat unit comprising a second side chain ester group comprising a nucleophilic group selected from the group consisting of alcohols, amines, thiols, and combinations thereof, wherein the nucleophilic group is capable of reacting with the multi-functional isocyanate crosslinking agent, and c) a third repeat unit comprising a hydrophobic side chain group not capable of reacting with the multi-functional isocyanate crosslinking agent; and treating the initial film layer thermally, photolytically, chemically, or by a combination thereof, thereby forming a composite filtration membrane comprising a selective layer disposed on the porous support membrane, the selective layer comprising a crosslinked poly(meth)acrylate, the crosslinked poly(meth)acrylate comprising a linking group produced by a reaction of the nucleophilic group with the multi-functional isocyanate crosslinking agent, the linking group selected from the group consisting of carbamates, ureas, thiocarbamates, and combinations thereof. In an embodiment, the method further comprises removing residual solvent from the selective layer after the treatment.

The coating mixture comprising the crosslinkable poly(meth)acrylate can include other additives, such as a surfactant and/or thickener for producing a uniform coating. The coating mixture can include additional additives to enhance physical and/or mechanical properties, including, for example, fillers, reinforcing agents, antistatic agents, and the like, such additional additives being readily determined by those of skill in the art without undue experimentation. Examples of fillers or reinforcing agents include glass fibers, clays, carbon fibers, silica, and talc. Examples of antistatic agents include glycerol monostearate, sodium stearyl sulfonate, and sodium dodecylbenzenesulfonate. Individual, as well as combinations of the foregoing additives may be used. Such additives may be mixed at a suitable time during the mixing of the components for forming the composition.

The thermal, photolytic, and/or chemical treatment of the initial film layer can be performed while the initial film layer still contains solvent. More specifically, the treatment comprises heating the initial film layer at 50° C. to 120° C. for 1 minute to 5 hours, and optionally drying the heated layer under vacuum for 1 to 24 hours at ambient temperature. In an embodiment, the treatment is initiated while the crosslinkable polymer and the solvent are present in the initial film layer in substantially the same weight ratio as in the mixture (i.e., little or no solvent is removed from the initial film layer before heating the initial film layer). In another embodiment, the treatment is initiated after more than 0 wt. % and less than 25 wt. % of the solvent has been removed from the initial film layer, based on total weight of the solvent in the initially coated film layer. The treatment conditions minimize penetration of the pores by the coating mixture, while effectively allowing formation of a densely crosslinked network.

The selective layer can be prepared as a self-supporting film. A method comprises:

disposing, on a temporary support, a mixture comprising i) a multi-functional isocyanate crosslinking agent comprising two or more isocyanate groups, ii) a solvent, iii) an optional accelerator, and iv) a crosslinkable poly(meth)acrylate, thereby forming an initial film layer, wherein the crosslinkable poly(meth)acrylate comprises a) a first repeat unit comprising a first side chain ester comprising a poly(alkylene oxide) chain segment, b) a second repeat unit comprising a second side chain ester group comprising a nucleophilic group selected from the group consisting of alcohols, amines, thiols, and combinations thereof, wherein the nucleophilic group is capable of reacting with the multi-functional isocyanate crosslinking agent, and c) a third repeat unit comprising a hydrophobic side chain group not capable of reacting with the multi-functional isocyanate crosslinking agent;

treating the initial film layer thermally, photolytically, chemically, or by a combination of the foregoing techniques, thereby forming a layer of crosslinked poly(meth)acrylate comprising a linking group produced by reaction of the nucleophilic group with the multi-functional isocyanate crosslinking agent, the linking group selected from the group consisting of carbamates, ureas, thiocarbamates, and combinations thereof;

optionally removing solvent, if present, from the layer of crosslinked poly(meth)acrylate; and separating the layer of crosslinked poly(meth)acrylate from the temporary support, thereby providing a self-supporting selective layer for fluid filtration.

In an embodiment, the method further comprises layering the self-supporting selective layer with a porous support membrane, thereby forming a composite filtration membrane. In another embodiment, the linking groups are exclusively carbamate.

The selective layer can have a thickness of 20 nm to 10 micrometers, more particularly 20 nm to 1 micrometer, and even more particularly 20 nm to 500 nm.

The accelerator can be selected from known catalysts for promoting the isocyanate-hydroxyl addition reactions, isocyanate-amine addition reactions, and isocyanate-thiol addition reactions. These include, for example, dibutyl tin dilaurate (DBTDL), dibutyl tin diacetate (DBTDA), manganese acetylacetonate (acac), aluminum acac, nickel acac, cobalt octoate, zinc octoate. Additional examples of accelerators include bismuth, aluminum and zirconium catalysts sold under the tradename K-KAT by King Industries Incorporated, Norwalk Conn.

The porous support membrane can be flexible or rigid, and can comprise a porous organic material, a porous inorganic material, a porous metal material, or a combination of the foregoing materials. Exemplary organic materials for porous support membranes include cellulose acetates, cellulose nitrates, regenerated celluloses, polysulfones, polyethersulfones, polypiperazine amides (such as FILMTEC sold by Dow Chemical), polyacrylonitriles and copolymers, track-etched polyesters (e.g., those sold under the trade name CYCLOPORE by Whatman Ltd), polycarbonates (e.g., those sold under the trade name NUCLEPORE by Whatman Ltd, poly(vinylidene difluoride), polypropylenes, Nylon 6,6, poly (tetrafluoroethylene)s (e.g., those sold under the trade names PORO-TEX and PARA-TEL by DeWAL Industries), and combinations of the foregoing materials. Exemplary inorganic materials for porous support membranes include nanoporous alumina ($Al_2O_3$) (e.g., those sold under the trade name ANOPORE by Whatman Ltd), beryllia (BeO), titania ($TiO_2$), zirconia ($ZrO_2$), silica ($SiO_2$), magnesia (MgO), calcia (CaO), yttria ($Y_2O_3$), strontia (SrO), lanthana ($La_2O_3$), hafnia ($HfO_2$), oxides of iron, manganese oxide (MnO), carbides, nitrides, silicides, and combinations of the foregoing materials. Exemplary metals for porous support membranes include for example nickel, nickel alloys, and stainless steel.

The porous support membrane can have an average pore diameter of 0.1 nm to about 1 micrometer, 1 nm to 100 nm (0.1 micrometer), 1 nm to 10 nm, or 1 nm to about 8 nm. It is understood that the term "pores" refers to regular and irregular voids and/or channels extending from one face to an opposite face of the porous support membrane. MF support membranes have an average pore size of about 0.1 micrometer and a molecular weight cutoff of about 500,000 Daltons. UF support membranes have an average pore size of about 0.01 micrometers to 0.1 micrometers and a molecular weight cutoff of about 1,000 Daltons to 500,000 Daltons. NF support membranes have an average pore size of about 0.001 micrometers to 0.01 micrometers and a molecular weight cutoff of about 100 Daltons to 1000 Daltons. RO support membranes have an average pore size of about 0.001 micrometers or less and a molecular weight cutoff of less than 100 Daltons. The average pore size of the polysulfone (PSF) ultrafiltration support membrane and poly(acrylonitrile) (PAN) ultrafiltration support membrane used in the examples below is about 0.01 micrometer (10 nm).

The porous support membrane can have a thickness of 1 micrometer to 10 millimeters, more particularly 1 micrometer to 100 micrometers, more particularly 1 micrometer to 80 micrometers, and even more particularly 1 micrometer to 50 micrometers.

In an embodiment, the crosslinkable poly(meth)acrylate has no repeat unit comprising an amine group or a thiol group capable of reacting with an isocyanate group of the crosslinking agent. In this instance, the crosslink reaction exclusively involves the reaction of side chain alcohol groups of the crosslinkable poly(meth)acrylate with the isocyanate groups of the crosslinking agent, and the linking groups formed by the crosslink reaction are exclusively carbamate groups.

Also disclosed are composite filtration membranes formed by the above-described methods. The composite filtration membranes comprise:

a porous support membrane; and a selective layer comprising a crosslinked poly(meth)acrylate disposed on one or more faces of the porous support membrane, the crosslinked poly(meth)acrylate comprising two or more poly(meth)acrylate backbones covalently linked to a bridging group, the backbones comprising i) respective first repeat units, each of which comprises a first side chain ester moiety comprising a hydrophilic poly(alkylene oxide) chain segment, ii) respective second repeat units, each of which comprises a second side chain ester moiety directly linked to the bridging group through a linking group selected from the group consisting of carbamate groups, urea groups, and thiocarbamate groups, and iii) respective third repeat units, each of which comprises a hydrophobic side chain moiety not directly linked to any bridging group. In an embodiment, each linking group is a carbamate group. In another embodiment, the bridging group is selected from the group consisting of

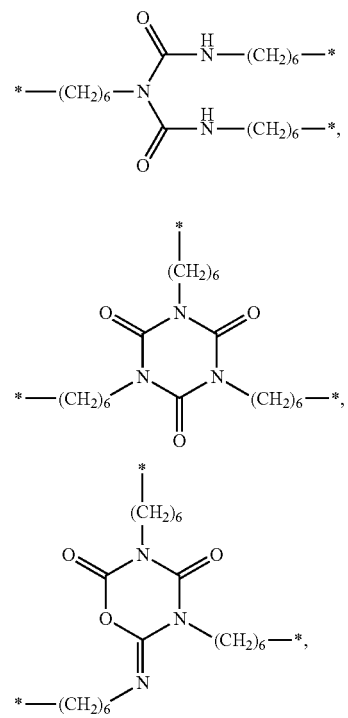

-continued

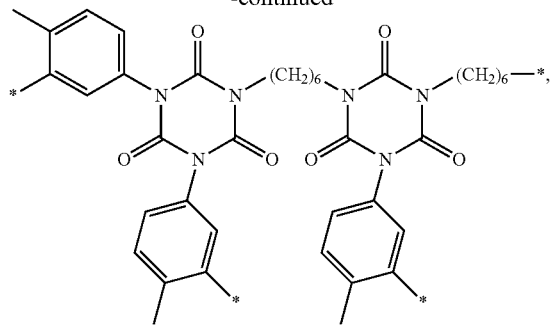

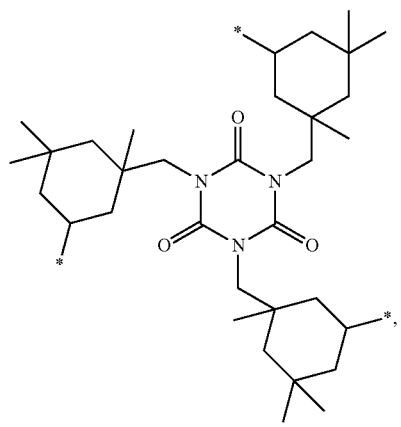

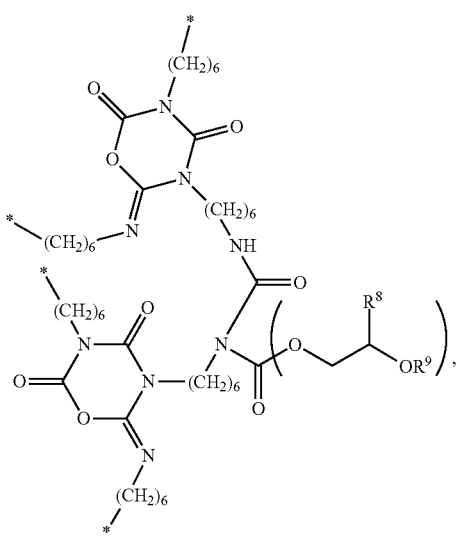

and combinations thereof, wherein —$R^8$ and —$R^9$ are monovalent radicals comprising one or more carbons.

Also disclosed are composite filtration membranes comprising:

a porous support membrane; and a selective layer comprising a crosslinked poly(meth)acrylate disposed on one or more faces of the porous support membrane, the crosslinked poly(meth)acrylate comprising two or more poly(meth)acrylate backbones; wherein each of the two or more backbones is connected to i) a crosslinked ester side chain moiety, the crosslinked ester side chain moiety being covalently linked to a bridging group by a linking group selected from the group consisting of carbamate groups, urea groups, and thiocarbamate groups, ii) a hydrophilic side chain ester moiety comprising a poly(alkylene oxide) chain segment, and iii) a hydrophobic side chain moiety not directly linked to any bridging group. The composite filtration membranes can have improved anti-fouling and/or salt rejection properties for purifying a water mixture compared to the porous support membrane. In an embodiment each linking group is a carbamate group. In another embodiment, the selective layer has a thickness between 20 nm and 10 micrometers.

Although poly(ethylene oxide) graft copolymers, also known as poly(ethylene glycol) (PEG) graft copolymers, have been previously used for composite filtration membranes, they are not crosslinked and hence adhesion to the support membrane is an issue when used for longer timescales. The disclosed selective layers are crosslinked, have good mechanical strength, and can be used in applications where high performance properties such as chemical resistance and good adhesion to the substrate are required. The composite filtration membranes described herein have good selectivity for divalent ions such as $Na_2SO_4$ and $MgSO_4$, and sharp molecular weight cut-offs for organic materials, as demonstrated by dye-filtration experiments in the examples that follow.

EXAMPLES

In the following examples, crosslinkable poly(methacrylate)s (i.e., prepared from methacrylate monomers) were coated on an ultrafiltration support membrane and were crosslinked using multi-functional isocyanate crosslinking agents to provide a high-permeability composite filtration membrane. The crosslinkable poly(methacrylate)s were polyols, comprising repeat units having a side chain alcohol group capable of reacting with a multi-functional isocyanate crosslinking agent. The crosslinkable poly(methacrylate)s also contained repeat units having poly(ethylene oxide) (PEG) side chain groups. The crosslinkable poly(methacrylate)s also contained repeat units having a hydrophobic side chain group not capable of reacting with the isocyanate crosslinking agent. The polyols were treated with a di- or tri-functional isocyanate to obtain crosslinked film layers. The presence of the pendant PEG groups makes these membrane materials resistant to bio-fouling and therefore advantageous for water purification applications. The crosslinkable multi-hydroxy functional meth(acrylic) graft copolymers can be easily synthesized using free radical polymerization. The disclosed composite filtration membranes allow for a wide range of performance properties by tuning the composition of the polyol or isocyanate building blocks, or by adjusting the swelling behavior of the composite membranes by changing the polyol to isocyanate ratios in the formulations. In this way, composite membrane properties such as water flux and salt rejection can be controlled.

Materials referenced in the following examples are listed in Table 3.

TABLE 3

| NAME | DESCRIPTION | SUPPLIER |
|---|---|---|
| HEMA | Hydroxyethyl Methacrylate, MW = 130.1 | Aldrich |
| MPEGMA | Poly(ethylene glycol) Methyl Ether Methacrylate ($M_n$ = 475) | Aldrich |
| MMA | Methyl Methacrylate, MW = 100.12 | Aldrich |
| DBTDL | Dibutyl Tin Dilaurate | Aldrich |
| DESMODUR ® N 3600 | Tri-isocyanate (MW 183 g/mol) crosslinking agent | Bayer Materials Science |
| PGMEA | Propylene Glycol Methyl Ether Acetate | Aldrich |
| Congo Red | Sodium salt of benzidinediazo-bis-l-naphthylamine-4-sulfonic acid, (MW 696.66 g/mol, 10.1 angstroms in circular diameter) | Aldrich |
| Brilliant Blue R | Benzenemethanaminium,N-[4-[[4-[(4-ethoxyphenyl)amino]phenyl][4-[ethyl[(3-sulfophenyl)methyl]amino]phenyl]methylene]-2,5-cyclohexadien-l-ylidene]-N-ethyl-3-sulfo-,hydroxide, inner salt, monosodium salt (MW 825.97, 11.1 angstroms in circular diameter) | Aldrich |
| PSF support | Polysulfone membrane, Model Number PS20, for ultrafiltration. Performance properties: water flux 900 (Lmh/bar), Marker = 20K dalton poly(ethylene glycol), % Marker Rejection = 95% at 30 psi/25° C./2000 ppm Marker; pore size about 0.1 micrometer | Sepro Membranes |
| PAN support | Polyacrylonitrile membrane, Model Number PAN350 for ultrafiltration. Performamce properties: water flux 1000 (LMH/bar), Marker = 20K Dalton poly(ethylene glycol), % Marker Rejection = 80% at 30 psi/25° C./ 2000 ppm Marker; pore size about 0.1 micrometer | Sepro Membranes |

Examples 1 to 13

Synthesis of Methacrylic Polyol, Poly(MMA-co-HEMA-co-MPEGMA)

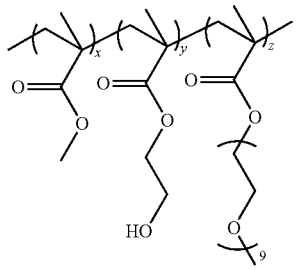

Poly(MMA-co-HEMA-co-MPEGMA)

Hydrophilic methacrylic polyols, poly(MMA-co-HEMA-co-MPEGMA), were synthesized by free-radical polymerization. The following procedure used in Example 1 is representative. To a 250-ml three neck round bottom flask equipped with a magnetic stir bar and a condenser were combined methyl methacrylate (MMA) (2.50 g, 25 mmol), hydroxyethyl methacrylate (HEMA) (1.30 g, 10 mmol) polyethylene glycol methyl ether methacrylate (MPEGMA) (7.15 g, 15 mmol, $M_n$=475), 30 ml THF and 82 mg of azobisisobutyronitrile (AIBN) were added. The reaction mixture was stirred for 24 hours at 60° C. for 24 hours. The poly(MMA-co-HEMA-co-MPEGMA), a crosslinkable poly(methacrylate), was precipitated in hexanes/ethyl ether mixture to remove any unreacted monomer. The copolymer was dried under vacuum and used for crosslinking with a tri-isocyanate crosslinking agent.

Table 4 lists the compositions, average molecular weight (number average $M_n$ and weight average $M_w$), and polydispersity index of the crosslinkable poly(methacrylates) formed in Examples 1-13.

TABLE 4

| | | Polymer Composition wt % | | | Polymer Composition mol % | | | Average Molecular weight | | |
|---|---|---|---|---|---|---|---|---|---|---|
| | | MMA | HEMA | MPEGMA | MMA | HEMA | MPEGMA | | | |
| Ex. | Description | (x) | (y) | (z) | (x) | (y) | (z) | Mn | Mw | PDI |
| 1 | Comparative | 23 | 12 | 65 | 49 | 20 | 31 | 28060 | 40600 | 1.44 |
| 2 | | 23 | 12 | 65 | 49 | 20 | 31 | 28060 | 40600 | 1.44 |
| 3 | | 23 | 12 | 65 | 49 | 20 | 31 | 28060 | 40600 | 1.44 |
| 4 | | 23 | 12 | 65 | 49 | 20 | 31 | 28060 | 40600 | 1.44 |
| 5 | | 33 | 16 | 51 | 58 | 22 | 20 | 18660 | 33500 | 1.82 |
| 6 | Comparative | 90 | 10 | 0 | 92 | 8 | 0 | 5400 | 9690 | 1.77 |
| 7 | Comparative | 70 | 10 | 10 | 88 | 10 | 3 | 6090 | 10400 | 1.71 |
| 8 | | 50 | 10 | 40 | 75 | 12 | 13 | 7800 | 12080 | 1.54 |
| 9 | | 30 | 10 | 60 | 59 | 15 | 26 | 7600 | 13560 | 1.78 |

TABLE 4-continued

| | | Polymer Composition wt % | | | Polymer Composition mol % | | | Average Molecular weight | | |
|---|---|---|---|---|---|---|---|---|---|---|
| | | MMA | HEMA | MPEGMA | MMA | HEMA | MPEGMA | | | |
| Ex. | Description | (x) | (y) | (z) | (x) | (y) | (z) | Mn | Mw | PDI |
| 10 | Comparative | 10 | 10 | 80 | 28 | 22 | 50 | 8670 | 15263 | 1.76 |
| 11 | Comparative | 0 | 10 | 90 | 0 | 28 | 72 | 8500 | 15100 | 1.78 |
| 12 | Comparative | 28 | 5 | 67 | 60 | 8 | 32 | 36000 | 53000 | 1.46 |
| 13 | | 20 | 20 | 60 | 41 | 32 | 27 | 29000 | 52900 | 1.82 |

Examples 1A to 13A

Crosslinked Film Formation

In the following examples, an "A" after the example number indicates a crosslinked film formed from the polymer of the corresponding example number in Table 4. Crosslinked poly(methacrylate) coatings for composite filtration membranes were prepared using commercially available DESMODUR® N 3600, a tri-isocyanate crosslinking agent having an equivalent weight of 183 g/mol, obtained from Bayer Materials Science. The procedure used to crosslink the polymer of Example 2 to form the crosslinked polymer film of Example 2A is representative. To a 20 ml glass vial equipped with a magnetic stir bar, a coating formulation was prepared by adding 0.25 g of poly(MMA-co-HEMA-co-MPEGMA) (hydroxyl equivalent weight=1095 g/mole), DESMODUR N 3600 (0.0816 g, NCO equivalent weight=183 g/mol), and PGMEA (0.66 ml). The coating mixture was stirred for 5 minutes and 1 drop of 1 wt % solution of dibutyl tin dilaurate (DBTDL) in PGMEA was added as catalyst. The solution was cast on an aluminum weight boat or on a glass panel using a draw down bar and allowed to crosslink with drying at 80° C. for 45 min. The coating was further dried at 60° C. for 24 hours under vacuum to ensure complete removal of the solvent. The resulting film was carefully peeled from the aluminum substrate and immersed in deionized water for one hour. The free standing film soaked in deionized water for at least 24 hours had a wet thickness of 50 to 150 micrometers.

Following this, a 2.5 cm diameter film sample was cut and used for water filtration experiments.

Table 5 lists the properties of the crosslinked poly(methacrylates) of Examples 1A to 13A. These include crosslink density (as hydroxy:isocyanate mole ratio), water uptake (in weight %), water permeability, and salt permeability of the crosslinked film layers, for films that could be tested.

TABLE 5

| Crosslinked Film Example | Description | NCO:OH ratio[a] | Water uptake Wt. %[b] | Water Permeability L · micrometer/M² H Bar[b] | NaCl Distribution Coefficient K | NaCl Permeability Coefficient P $10^{-8}$ cm² sec$^{-1}$ |
|---|---|---|---|---|---|---|
| 1A | Comparative | 0.25:1 | 216 | Hydrogel, poor film | | |
| 2A | | 0.5:1 | 110 | 50 | 0.34 | |
| 3A | | 0.75:1 | 95 | 42 | 0.28 | |
| 4A | | 1:1 | 76 | 8 | 0.17 | 6.70 |
| 5A | | 1:1 | 22 | 16 | 0.16 | 9.11 |
| 6A | Comparative | 1:1 | Film too brittle | | | |
| 7A | Comparative | 1:1 | Film too brittle | | | |
| 8A | | 1:1 | 22 | | 0.13 | 4.32 |
| 9A | | 1:1 | 67.3 | 18 | 0.49 | |
| 10A | Comparative | 1:1 | Hydrogel, poor film | | | |
| 11A | Comparative | 1:1 | Hydrogel, poor film | | | |
| 12A | Comparative | 1:1 | 79 | | | |
| 13A | | 1:1 | 73 | | | |

[a] In each example, the crosslinking agent was DESMODUR N-3600
[b] Some samples were not tested due to poor film quality.

Water Uptake.

Figure 3:
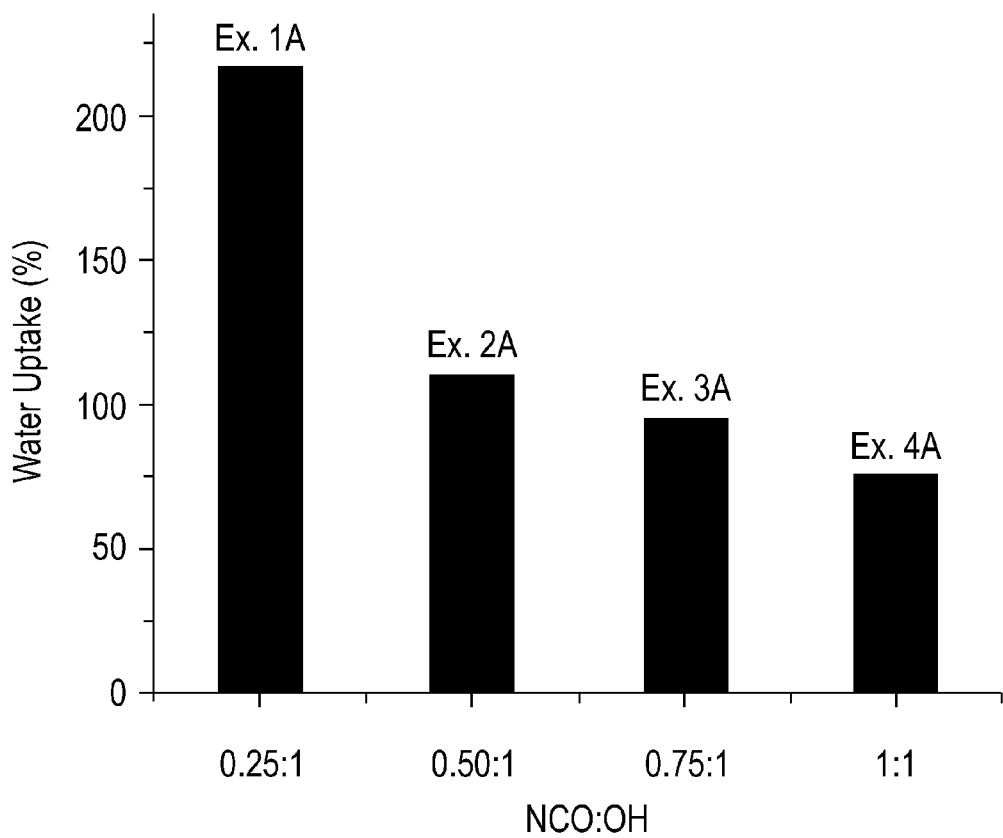
FIG. 3 is a bar graph showing % water uptake as a function of NCO:OH molar ratio of the free-standing film layers prepared in Examples 2A to 4A.

Water uptake of the free standing crosslinked films of Examples 1A to 4A was measured as a function of NCO:OH mole ratio. Examples 1A to 4A utilized a polymer in which the MMA/HEMA/MPEGMA weight ratio was 23/12/65, based on total weight of monomer used in the polymerization and the NCO:OH mole ratio was varied. When the NCO:OH mole ratio was less than 0.5 (Example 1A), the film behaved like a hydrogel and was considered too poor for further testing of water or salt permeability properties. In Examples 2A to 4A, the weight percent uptake of water of the free standing films decreased as the NCO:OH mole ratio was increased from 0.5 to 0.75 to 1.0. FIG. 3 is a bar graph showing the weight percent water uptake data of these coatings (Examples 1A to 4A) as a function of NCO:OH mole ratio. Thus, the water uptake and water permeability generally decrease with increasing crosslink density (i.e., increasing NCO:OH mole ratio). Water uptake of Examples 5A, 8A, 9A, 12A and 13A are also shown in Table 5.

Water Permeability of the Free Standing Films.

Figure 4:
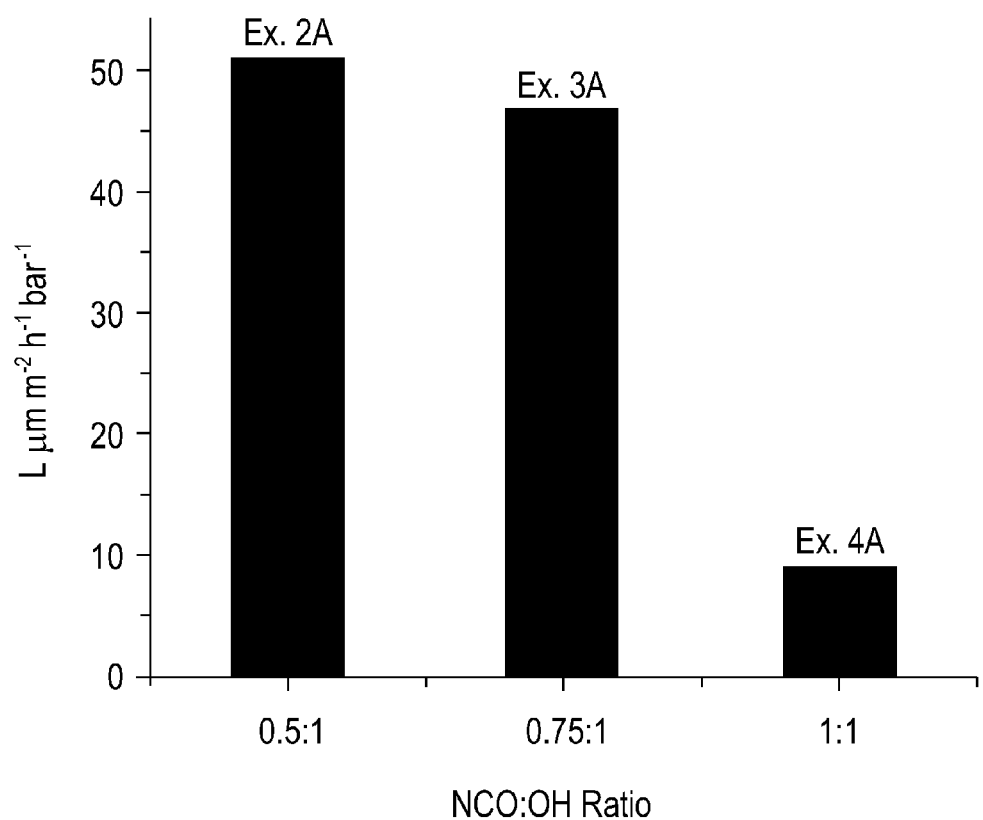
FIG. 4 is a bar graph showing pure water permeability as a function of NCO:OH molar ratio of the free-standing film layers of Examples 2A to 4A.

Pure water permeability (PWP) experiments using the crosslinked membranes of Examples 2A to 4A was performed using an Amicon dead-end filtration cell with a cell volume of 15 mL and an effective filtration area of 3.5 cm². Water permeability is an intrinsic property of the material and it can be directly related to the water flux of the composite membranes. Thin film composite membranes having high PWP are desirable. All experiments were done at 50 psi (3.79 bar), and the membrane was allowed to stabilize by passing deionized water through for 1 to 2 hours before measuring the permeability. The results are shown in the bar graph of FIG. 4, which shows that the formulations with higher NCO:OH crosslinking ratio had lower water permeability. Thus, the water flux of a given membrane can be tuned to a desirable level by varying the NCO:OH mole ratio for a given monomer composition. The units in FIG. 4 are liters per square meter per hour at 1 bar and at a thickness of 1 micrometer. Water permeability of Examples 5A and 9A are also shown in Table 5.

Salt Distribution Coefficient K.

Salt distribution coefficient K was determined from the rate of desorption of salt into deionized water from a film previously equilibrated with a 1 m NaCl solution (50 mL) at 25° C. for at least 24 hours while slowly stirring the solution at approximately 100 rpm. The temperature of the deionized water (50 mL) in the extraction bath and in the conductivity cell was maintained at 25° C. A conductivity cell with a cell constant of 0.1 cm$^{-1}$ (LR 325/01, WTW, Germany) and a conductivity meter (Inolab Cond 730, WTW) were used to record the conductivity in the extraction bath as a function of time. Salt distribution coefficient is an intrinsic property of the material and is a function of polymer composition and crosslinking density. It is the ratio of amount of salt absorbed by the film to the rate of desorption into deionized water. A lower NaCl distribution coefficient K is desirable for a given level of water permeability. Salt distribution coefficient K of Examples 5A, 8A, and 9A are also shown in Table 5.

Salt Permeability Coefficient P.

NaCl permeability P for each of Examples 4A, 5A, and 8A was measured by desorption experiments at 25° C. NaCl permeability coefficient P ($10^{-8}$ cm² sec$^{-1}$) was calculated as the product of NaCl diffusivity D times the NaCl distribution coefficient K (i.e., P=D×K). Salt diffusivity was determined from the rate of desorption of salt into deionized water from a film previously equilibrated with a 1 M NaCl solution (50 mL) at 25° C. for at least 48 hours while slowly stirring the solution at approximately 100 rpm. The temperature of the deionized water (50 mL) in the extraction bath and in the conductivity cell was maintained at 25° C. A conductivity cell with a cell constant of 0.100 cm$^{-1}$ (LR 325/01, WTW, Germany) and a conductivity meter (Inolab Cond 730, WTW) were used to record the conductivity in the extraction bath as a function of time. The diffusivity was determined by fitting the linear portion of the salt desorption as a function of the square root of extraction time to Fickian diffusion models. NaCl permeability is an intrinsic property of the membrane and it is a function of polymer composition and the crosslinking density. It is the salt passage through the film per unit time. A lower NaCl permeability coefficient P is desirable for a given level of water permeability.

Examples 14 and 15

Figure 5:
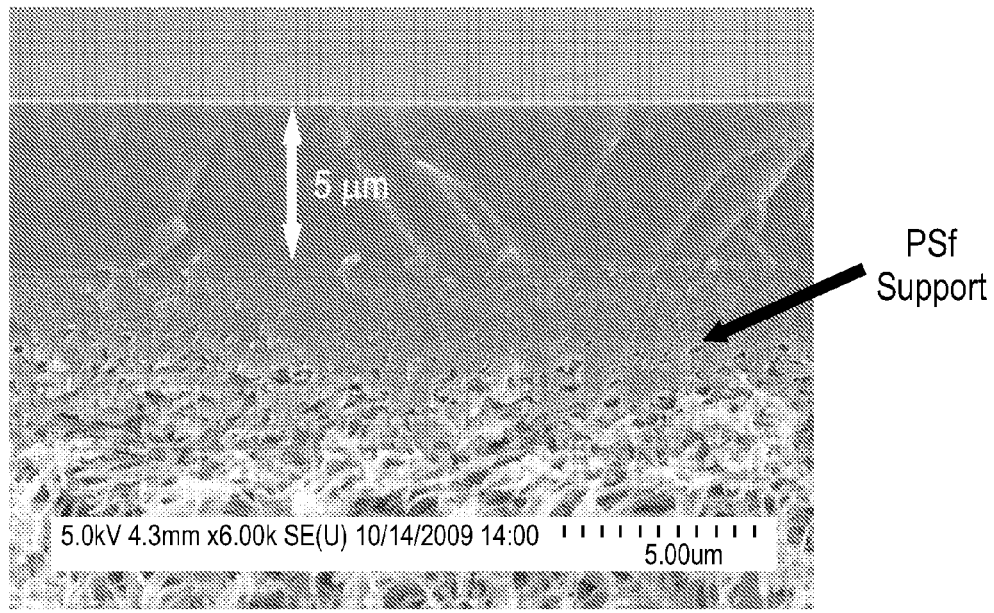
FIG. 5 is a scanning electron micrograph (SEM) image of the thin film composite filtration membrane prepared using a porous polysulfone (PSF) ultrafiltration support membrane (Example 14).
Figure 6:
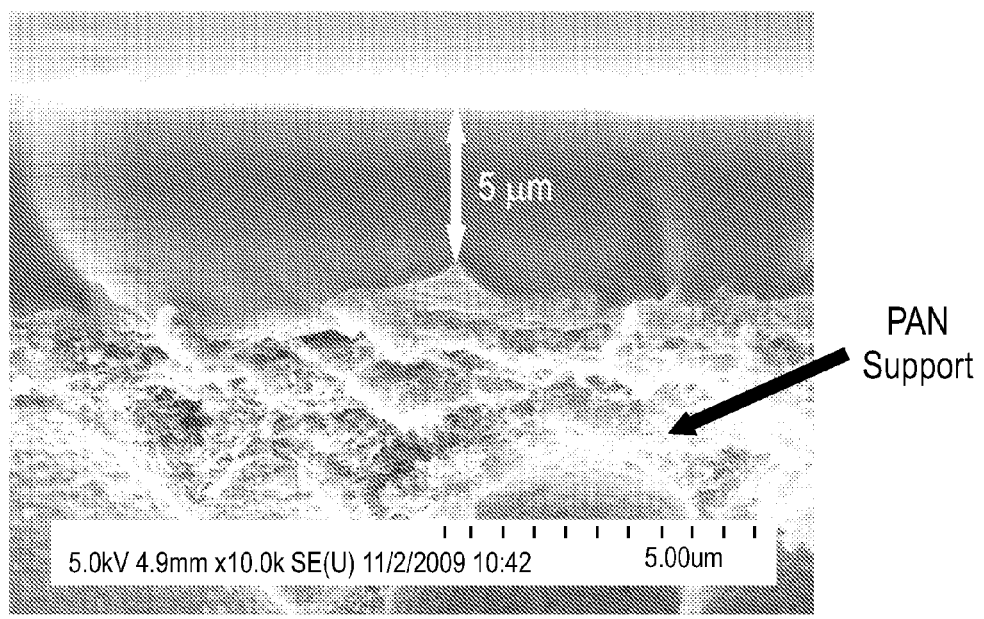
FIG. 6 is a scanning electron micrograph (SEM) image of the thin film composite filtration membrane prepared using a porous polyacrylonitrile (PAN) ultrafiltration support membrane (Example 15).

Composite Filtration Membrane Having a Crosslinked Poly(Methacrylate) Selective Layer Thin film composite (TFC) filtration membranes were formed on polysulfone (PSF) (Example 14) and polyacrylonitrile (PAN) (Example 15) ultrafiltration support membranes using drawdown techniques. PSF or PAN support membranes from Serpo Membranes were pre-treated by soaking in isopropanol for 30 minutes. The membranes were later dried and attached to a glass panel using masking tape. A Gardco draw-down coating bar with 1 mil clearance was used to coat the support membrane with 20 or 30 wt. % coating solution containing the crosslinkable poly(meth)acrylate, multi-functional isocyanate crosslinking agent, and DBTDL catalyst in PGMEA or ethyl acetate. PGMEA was the solvent for the PSF support, and ethyl acetate was the solvent for the PAN support. The coated structure was cured with drying at 80° C. for 45 min, and then further dried under vacuum for 12 hours. FIG. 5 and FIG. 6 are SEM images of the resulting composite filtration membranes designated Example 14 (PSF support) and Example 15 (PAN support), respectively. The images confirm the presence of the crosslinked poly(methacrylate) film layer (selective layer) disposed on the PSF and PAN ultrafiltration support membranes. In each case, the approximate thickness of the selective layer was about 5 micrometers. Examples 14 and 15 were then characterized for water flux and various monovalent and divalent salt rejections.

Pure Water Flux of Composite Filtration Membrane Example 15 (PAN Support).

Pure water flux of composite filtration membrane Example 15 was determined by cutting a circular sample having a 2.5 inch diameter. The sample was loaded on a Sterilite dead-end filtration cell with a cell volume of 200 ml and an effective filtration area of 14.6 cm². The cell was stirred at 700 rpm and a pressure of 200 psi (13.78 bar) was used. The pure water flux for Example 15 was 8.05 liters per square meter per hour (LMH).

Monovalent and Divalent Salt Rejection of Composite Filtration Membrane Example 15.

Figure 7:
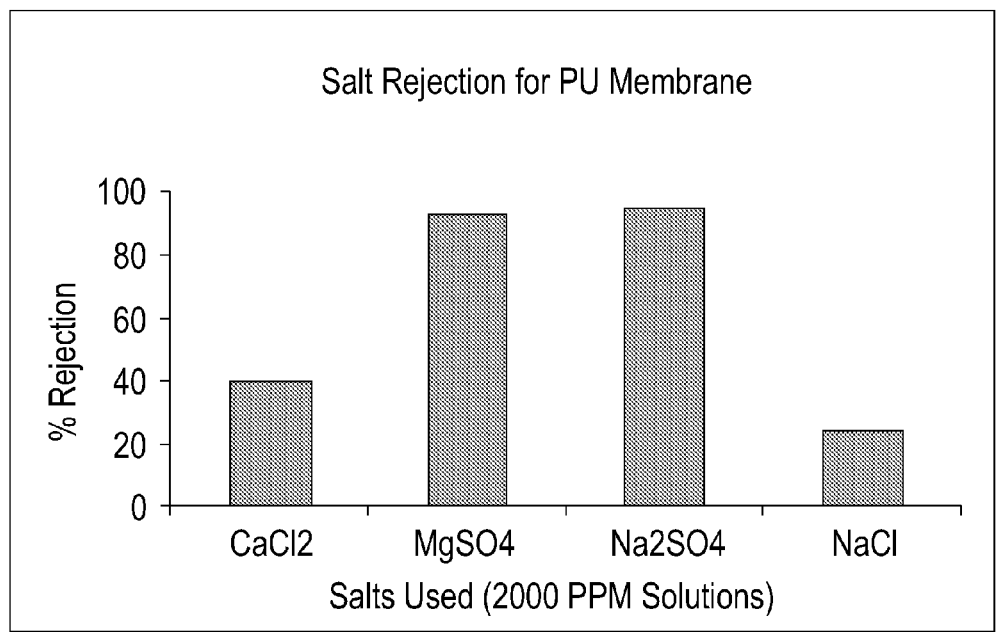
FIG. 7 is a bar graph showing salt rejection values for the composite filtration membrane prepared with PAN ultrafiltration support membrane (Example 15).

Salt rejection values for the membrane of Example 15 were determined by loading the sample on a Sterilite dead-end filtration cell with 2000 ppm solutions of NaCl, MgSO$_4$, CaCl$_2$ and Na$_2$SO$_4$. The cell was stirred at 700 rpm using a stir plate to minimize concentration polarization. The membrane was allowed to stabilize for 2 hours before collecting the samples. Salt rejection values for Example 15 are shown in the bar graph of FIG. 7. Approximately 90% of MgSO$_4$ and NaSO$_4$ was rejected, approximately 40% of CaCl$_2$ was rejected, and approximately 20% of NaCl was rejected by the Example 15 membrane.

Nanometer Range Size-Selectivity of Composite Filtration Membrane Example 15.

To determine the molecular weight cut-off of the Example 15 membrane rigid dyes were used as probes. A 100 mg/L dye solution was filtered through the PU membrane at 150 psi while stirring the cell at 700 rpm to minimize concentration polarization. It was observed that Brilliant Blue R (11.1 Å):

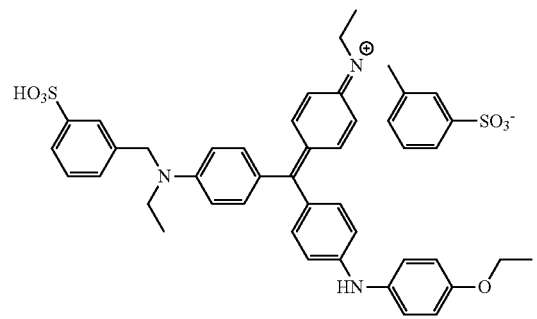

Figure 8A:
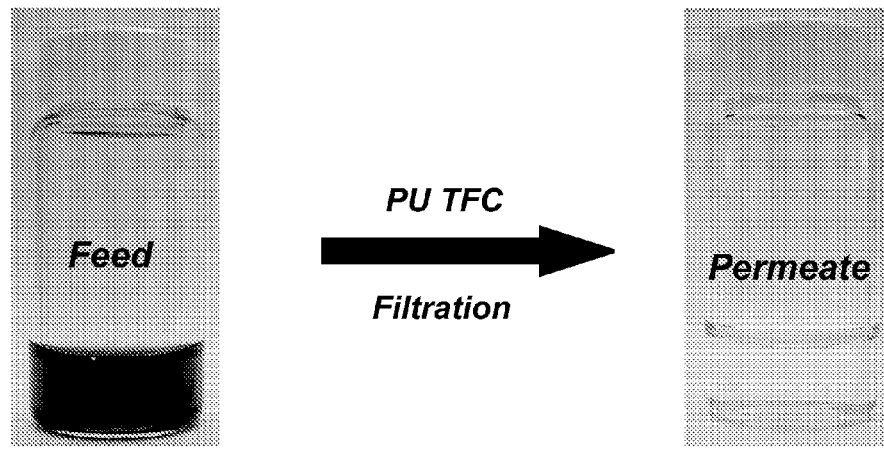
FIG. 8A is a black and white photograph of two solutions. On the left is a feed solution containing Brilliant Blue R dye, and on the right is a permeate solution obtained after passing the feed solution through composite filtration membrane Example 15, prepared with PAN ultrafiltration support membrane. The feed solution is blue (appearing gray in photograph) and the permeate is colorless (appearing white), indicating the dye was rejected by Example 15.

Briliant Blue R was rejected more than 97% by the Example 15 membrane, as shown in the black and white photograph of the feed and permeate solutions in FIG. 8A. The feed solution is blue (appearing dark gray) and the permeate solution is colorless (appearing white). Congo Red (10.1 Å):

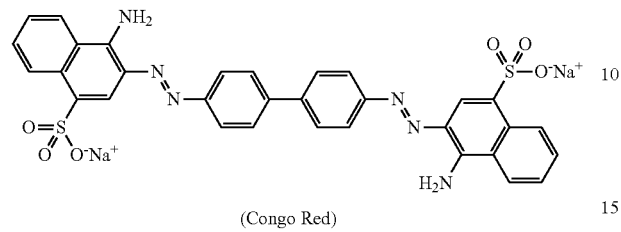

Figure 8B:
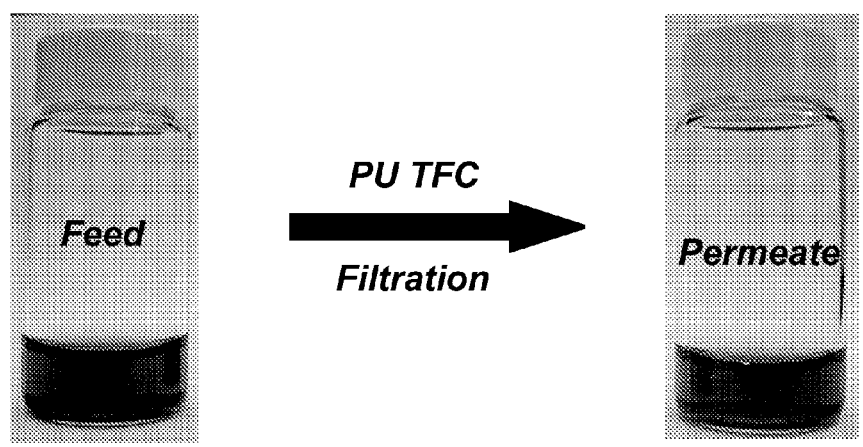
FIG. 8B is a black and white photograph of two solutions. On the left is a feed solution containing Congo Red dye, and on the right is a permeate solution obtained after passing the feed solution through composite filtration membrane Example 15, prepared with PAN ultrafiltration support membrane. The feed solution and permeate solution are each red (appearing gray in the photograph), indicating the dye was not rejected by composite filtration membrane Example 15.

(Congo Red)

was not rejected by the Example 15 membrane, as shown in the black and white photograph of the feed and permeate solutions of FIG. 8B. The feed and permeate solutions are both red (appearing dark gray).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

What is claimed is:

1. A composition, comprising:
   a crosslinked poly(meth)acrylate comprising two or more poly(meth)acrylate backbones covalently linked to a bridging group, the backbones comprising i) respective first repeat units, each of which comprises a first side chain ester moiety comprising a hydrophilic poly(alkylene oxide) chain segment, ii) respective second repeat units, each of which comprises a second side chain ester moiety directly linked to the bridging group through a linking group selected from the group consisting of carbamate groups, and thiocarbamate groups, and iii) respective third repeat units, each of which comprises a hydrophobic side chain moiety not directly linked to any bridging group.

2. The composition of claim 1, wherein the composition has anti-fouling and/or salt rejection properties suitable for fluid purification.

3. The composition of claim 1, wherein each linking group is a carbamate group.

4. The composition of claim 1, wherein the bridging group is selected from the group consisting of

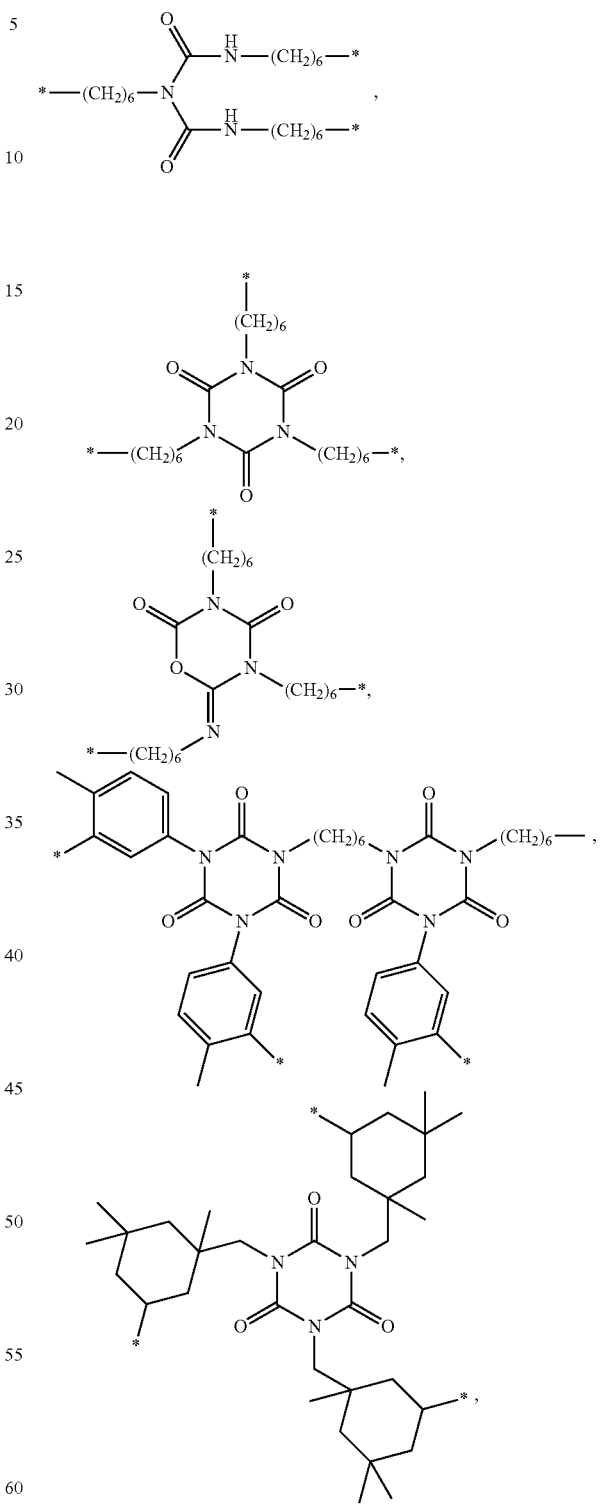

and
combinations thereof, wherein —$R^8$ and —$R^9$ are monovalent radicals comprising one or more carbons.

5. The composition of claim 1, wherein each linking group is a thiocarbamate group.

6. A method, comprising:
applying a chemical and/or physical treatment to a porous support membrane to increase its hydrophilicity, thereby forming a treated porous support membrane;
disposing, on a surface of the treated porous support membrane, a mixture comprising i) a multi-functional isocyanate crosslinking agent comprising two or more isocyanate groups, ii) a solvent, iii) an optional accelerator, and iv) a crosslinkable poly(meth)acrylate, thereby forming an initial film layer disposed on the surface, wherein the crosslinkable poly(meth)acrylate comprises a) a first repeat unit comprising a first side chain ester comprising a poly(alkylene oxide) chain segment, b) a second repeat unit comprising a second side chain ester group comprising a nucleophilic group selected from the group consisting of alcohols, thiols, and combinations thereof, wherein the nucleophilic group is capable of reacting with the multi-functional isocyanate crosslinking agent, and c) a third repeat unit comprising a hydrophobic side chain group not capable of reacting with the multi-functional isocyanate crosslinking agent; and
treating the initial film layer thermally, photolytically, chemically, or by a combination thereof, thereby forming a composite filtration membrane comprising a selective layer disposed on the surface of the treated porous support membrane, the selective layer comprising a crosslinked poly(meth)acrylate, the crosslinked poly(meth)acrylate comprising a linking group produced by a reaction of the nucleophilic group with the multi-functional isocyanate crosslinking agent, the linking group selected from the group consisting of carbamates, ureas, thiocarbamates, and combinations thereof.

7. The method of claim 6, wherein the isocyanate crosslinking agent has the formula (7):

$$R^7\text{-}(\text{NCO})_m \quad (7),$$

wherein
m is an integer greater than or equal to 2, and
$R^7$ represents a core structure having a valency of m and comprising from 1 to 10,000 carbons.

8. The method of claim 6, wherein the crosslinkable poly(meth)acrylate has the formula (5),

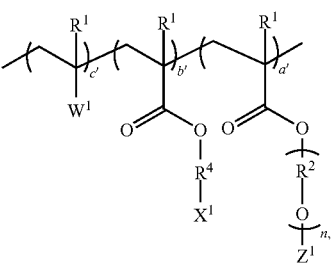

(5)

wherein
a', b', and c' are positive numbers,
each —$R^1$ is independently a hydrogen or methyl group,
—$R^2$— is a divalent radical selected from the group consisting of ethylene, 2-propylene, butylene, and combinations thereof,
n is a positive integer greater than 1, and
—$Z^1$ is a monovalent radical selected from the group consisting of —H, —$R^3$, -$L^1$-OH, -$L^1$-$NH_2$, -$L^1$-N(H)$R^3$, -$L^1$-N($R^3$)$_2$, -$L^1$-SH, and -$L^1$-S$R^3$, wherein —$R^3$ is a monovalent radical comprising 1 to 20 carbons,
-$L^1$- is a divalent linking group comprising 1 to 20 carbons,
—$R^4$— is a linear, branched or cyclic divalent radical selected from the group consisting of alkylenes, fluoroalkylenes, arylenes, arylalkylenes, alkylarylenes, and silicon containing groups,
—$X^1$ is a nucleophilic monovalent radical selected from the group consisting of —OH and —SH, wherein —$X^1$ is capable of reacting with the multi-functional isocyanate crosslinking agent to form a covalent bond, and
—$W^1$ is a monovalent radical comprising two or more carbons.

9. The method of claim 8, wherein —W' is —$CO_2R^6$, wherein —$R^6$ is a linear, branched or cyclic monovalent radical selected from the group consisting of alkylenes, fluoroalkylenes, arylenes, arylalkylenes, alkylarylenes, and silicon containing groups, and —$R^6$ is not capable of reaction with an isocyanate.

10. The method of claim 6, wherein the first repeat unit of the crosslinkable poly(meth)acrylate is derived from a poly(ethylene glycol) methyl ether methacrylate (MPEGMA), the second repeat unit is derived from 2-hydroxyethyl methacrylate (HEMA), and the third repeat unit is derived from methyl methacrylate (MMA).

11. The method of claim 6, wherein the multi-functional isocyanate crosslinking agent is selected from the group consisting of

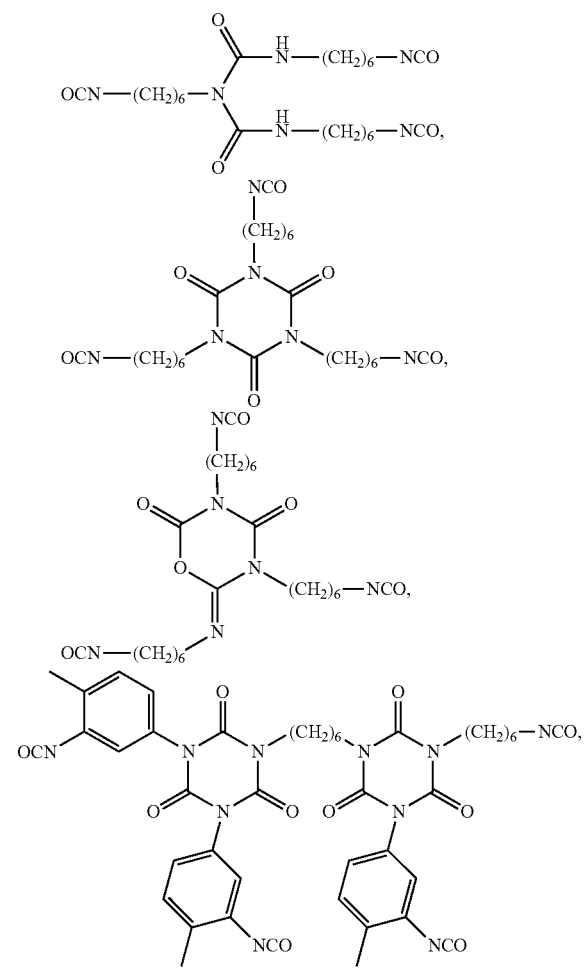

-continued

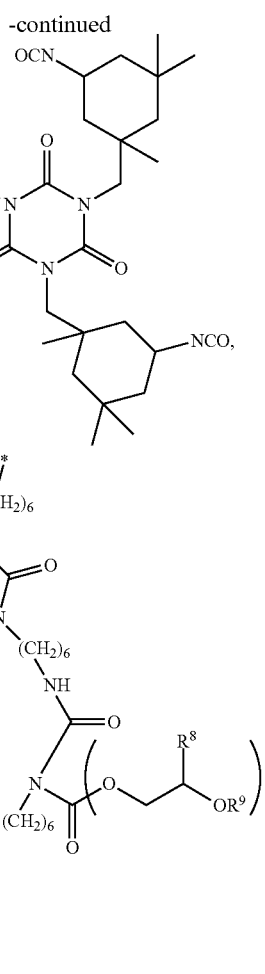

and combinations thereof, wherein —R⁸ and —R⁹ are monovalent radicals comprising one or more carbons.

12. The method of claim 6, wherein the crosslinked poly (meth)acrylate has the formula (8):

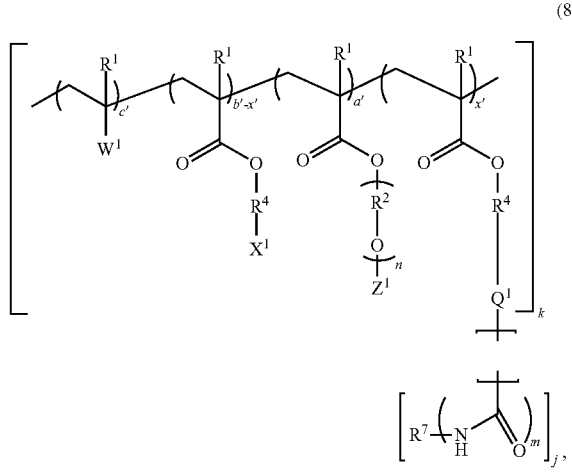

wherein
n is a positive integer greater than 1,
m is a positive integer greater than or equal to 2,
a', b', and c' are positive numbers,
j represents an average number of bridging groups bound to one poly(meth)acrylate chain, j being greater than or equal to 1,
k represents an average number of poly(meth)acrylate chains bound to one bridging group, k being greater than or equal to 1,
x' is a positive number less than or equal to b',
each —R¹ is independently a hydrogen or methyl group,
—R²— is a divalent radical selected from the group consisting of ethylene, 2-propylene, butylene, and combinations thereof,
—R⁴— is a linear, branched or cyclic divalent radical selected from the group consisting of alkylenes, fluoroalkylenes, arylenes, arylalkylenes, alkylarylenes, and silicon containing groups,
—W¹ is a monovalent radical comprising two or more carbons,
R⁷ is a bridging group having a valency of m and comprising 1 to 10,000 carbons,
—N(H)C(=O)-Q¹- is a divalent linking group selected from the group consisting of carbamates, and thiocarbamates,
—Z¹ is a monovalent radical selected from the group consisting of —H, —R³, -L¹-OH, -L¹—NH₂, -L¹-N(H)R³, -L¹-N(R³)₂, -L¹-SH, and -L¹-SR³, wherein —R³ is a monovalent radical comprising 1 to 20 carbons,
-L¹- is a divalent radical comprising 1 to 20 carbons,
-Q¹- is a divalent radical selected from the group consisting of —O— and —S—, and
—X¹ is a nucleophilic monovalent radical selected from the group consisting of —OH and —SH.

13. The method of claim 12, wherein —R²— is ethylene, —Z¹ is methyl, —X¹ is hydroxyl, -Q¹- is —O—, x'=b', and m is 3 or more.

14. The method of claim 12, wherein W' is —CO₂R⁶, wherein —R⁶ is a linear, branched or cyclic monovalent radical selected from the group consisting of alkylenes, fluoroalkylenes, arylenes, arylalkylenes, alkylarylenes, and silicon containing groups.

15. A method, comprising:
disposing, on a temporary support, a mixture comprising i) a multi-functional isocyanate crosslinking agent comprising two or more isocyanate groups, ii) a solvent, iii) an optional accelerator, and iv) a crosslinkable poly (meth)acrylate, thereby forming an initial film layer, wherein the crosslinkable poly(meth)acrylate comprises a) a first repeat unit comprising a first side chain ester comprising a poly(alkylene oxide) chain segment, b) a second repeat unit comprising a second side chain ester group comprising a nucleophilic group selected from the group consisting of alcohols, thiols, and combinations thereof, wherein the nucleophilic group is capable of reacting with the multi-functional isocyanate crosslinking agent, and c) a third repeat unit comprising a hydrophobic side chain group not capable of reacting with the multi-functional isocyanate crosslinking agent;
treating the initial film layer thermally, photolytically, chemically, or by a combination of the foregoing techniques, thereby forming a layer of crosslinked poly (meth)acrylate comprising a linking group produced by reaction of the nucleophilic group with the multi-functional isocyanate crosslinking agent, the linking group selected from the group consisting of carbamates, thiocarbamates, and combinations thereof;
optionally removing solvent, if present, from the layer of crosslinked poly(meth)acrylate; and separating the layer of crosslinked poly(meth)acrylate from the temporary support, thereby providing a self-supporting selective layer for fluid filtration.

16. The method of claim 15, further comprising layering the self-supporting selective layer with a porous support membrane, thereby forming a composite filtration membrane.

17. A composite filtration membrane, comprising:
a porous support membrane; and
a selective layer comprising a crosslinked poly(meth)acrylate disposed on one or more faces of the porous support membrane, the crosslinked poly(meth)acrylate comprising two or more poly(meth)acrylate backbones covalently linked to a bridging group, the backbones comprising i) respective first repeat units, each of which comprises a first side chain ester moiety comprising a hydrophilic poly(alkylene oxide) chain segment, ii) respective second repeat units, each of which comprises a second side chain ester moiety directly linked to the bridging group through a linking group selected from the group consisting of carbamate groups and thiocarbamate groups, and iii) respective third repeat units, each of which comprises a hydrophobic side chain moiety not directly linked to any bridging group.

18. The composite filtration membrane of claim 17, wherein each linking group is a carbamate group.

19. The composite filtration membrane of claim 17, wherein the bridging group is selected from the group consisting of

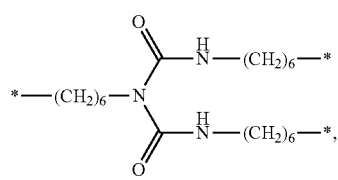

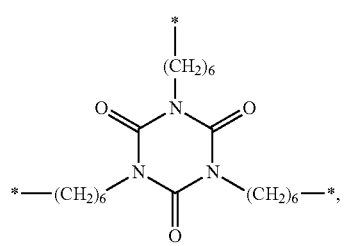

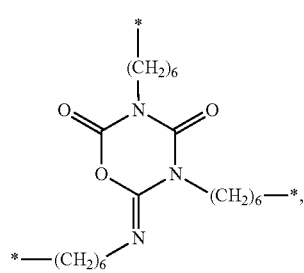

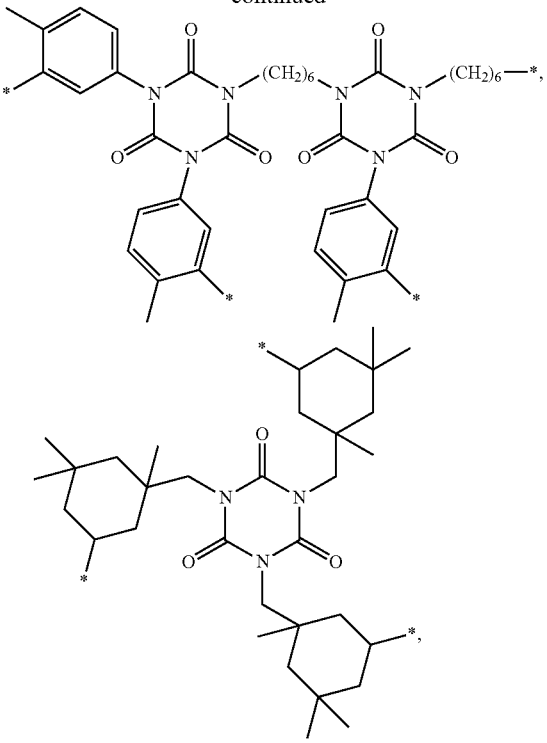

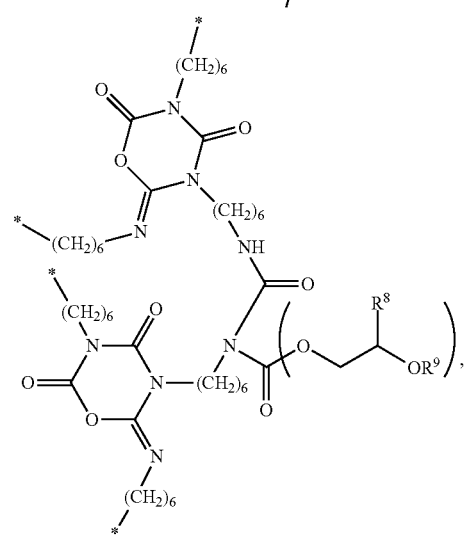

and
combinations thereof, wherein —$R^8$ and —$R^9$ are monovalent radicals comprising one or more carbons.

20. The composite filtration membrane of claim 17, wherein the selective layer has a thickness between 20 nm and 10 micrometers.

21. The composite filtration membrane of claim 17, wherein the composite filtration membrane is suitable for purifying a water mixture, and has improved anti-fouling and/or salt rejection properties compared to the porous support membrane.

22. A composition, comprising:
a crosslinked poly(meth)acrylate comprising two or more poly(meth)acrylate backbones; wherein each of the two or more backbones is connected to i) a crosslinked ester side chain moiety, the crosslinked ester side chain moiety being covalently linked to a bridging group by a linking group selected from the group consisting of carbamate groups and thiocarbamate groups, ii) a hydrophilic side chain ester moiety comprising a poly(alkylene oxide) chain segment, and iii) a hydrophobic side chain moiety not directly linked to any bridging group.

23. The composition of claim 22, wherein the composition has anti-fouling and/or salt rejection properties suitable for fluid purification.

24. The composition of claim 22, wherein each linking group is a carbamate group.

25. The composition of claim 22, wherein the bridging group is selected from the group consisting of

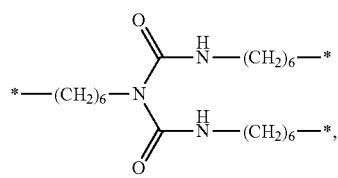

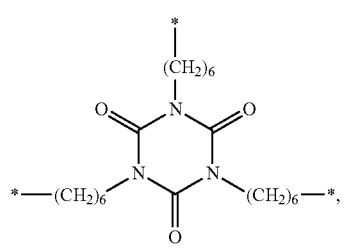

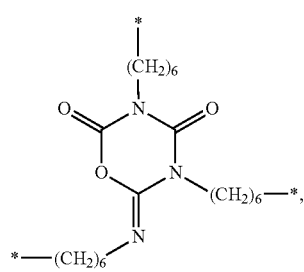

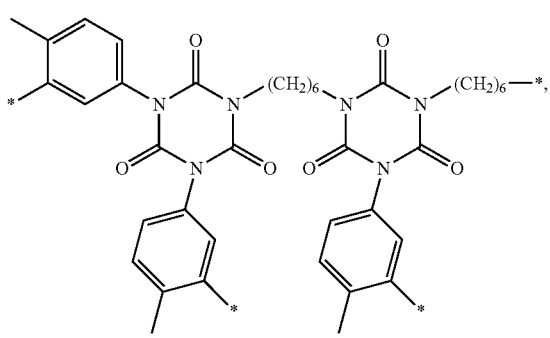

-continued

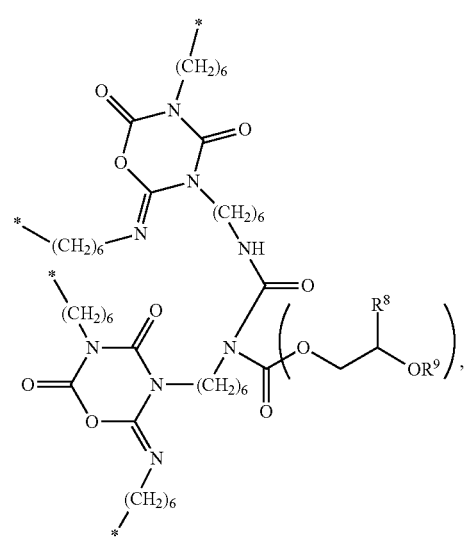

and combinations thereof, wherein $-R^8$ and $-R^9$ are monovalent radicals comprising one or more carbons.

26. The composition of claim 22, wherein each linking group is a thiocarbamate group.

27. A composition, comprising:
a crosslinked poly(meth)acrylate comprising two or more poly(meth)acrylate backbones covalently linked to a bridging group, the backbones comprising i) respective first repeat units, each of which comprises a first side chain ester moiety comprising a hydrophilic poly(alkylene oxide) chain segment, ii) respective second repeat units, each of which comprises a second side chain ester moiety directly linked to the bridging group through a linking group selected from the group consisting of carbamate groups, urea groups, and thiocarbamate groups, and iii) respective third repeat units, each of which comprises a hydrophobic side chain moiety not directly linked to any bridging group, wherein the crosslinked poly(meth)acrylate has the formula (8):

(8)

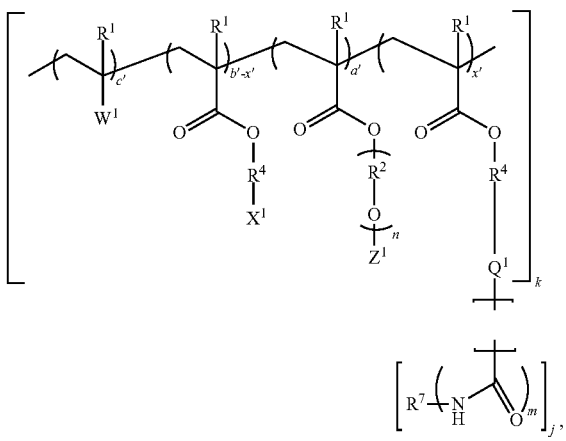

wherein
- n is a positive integer greater than 1,
- m is a positive integer greater than or equal to 2,
- a', b', and c' are positive numbers,
- j represents an average number of bridging groups bound to one poly(meth)acrylate chain, j being greater than or equal to 1,
- k represents an average number of poly(meth)acrylate chains bound to one bridging group, k being greater than or equal to 1,
- x' is a positive number less than or equal to b',
- each —$R^1$ is independently a hydrogen or methyl group,
- —$R^2$— is a divalent radical selected from the group consisting of ethylene, 2-propylene, butylene, and combinations thereof,
- —$R^4$— is a linear, branched or cyclic divalent radical selected from the group consisting of alkylenes, fluoroalkylenes, arylenes, arylalkylenes, alkylarylenes, and silicon containing groups,
- —$W^1$ is a monovalent radical comprising two or more carbons,
- $R^7$ is a bridging group having a valency of m and comprising 1 to 10,000 carbons,
- —N(H)C(=O)-$Q^1$- is a divalent linking group selected from the group consisting of carbamates, ureas, and thiocarbamates,
- —$Z^1$ is a monovalent radical selected from the group consisting of —H, —$R^3$, -$L^1$-OH, -$L^1$—$NH_2$, -$L^1$-N(H)$R^3$, -$L^1$-N($R^3$)$_2$, -$L^1$-SH, and -$L^1$-S$R^3$, wherein —$R^3$ is a monovalent radical comprising 1 to 20 carbons,
- -$L^1$- is a divalent radical comprising 1 to 20 carbons,
- -$Q^1$- is a divalent radical selected from the group consisting of —O—, —N(H)—, —N($R^5$)—, and —S—, wherein —$R^5$ is a monovalent radical comprising 1 to 20 carbons, and
- —$X^1$ is a nucleophilic monovalent radical selected from the group consisting of —OH, —$NH_2$, —N(H)$R^5$, and —SH.

28. The composition of claim 27, wherein —$R^2$— is ethylene, —$Z^1$ is methyl, —$X^1$ is hydroxyl, -$Q^1$- is —O—, x'=b', and m is 3 or more.

29. The composition of claim 27, wherein W' is —$CO_2R^6$, wherein —$R^6$ is a linear, branched or cyclic monovalent radical selected from the group consisting of alkylenes, fluoroalkylenes, arylenes, arylalkylenes, alkylarylenes, and silicon containing groups.

30. A composition, comprising:
a crosslinked poly(meth)acrylate comprising two or more poly(meth)acrylate backbones covalently linked to a bridging group, the backbones comprising i) respective first repeat units, each of which comprises a first side chain ester moiety comprising a hydrophilic poly(alkylene oxide) chain segment, ii) respective second repeat units, each of which comprises a second side chain ester moiety directly linked to the bridging group through a linking group selected from the group consisting of carbamate groups, urea groups, and thiocarbamate groups, and iii) respective third repeat units, each of which comprises a hydrophobic side chain moiety not directly linked to any bridging group, wherein the crosslinked poly(meth)acrylate has the formula (9):

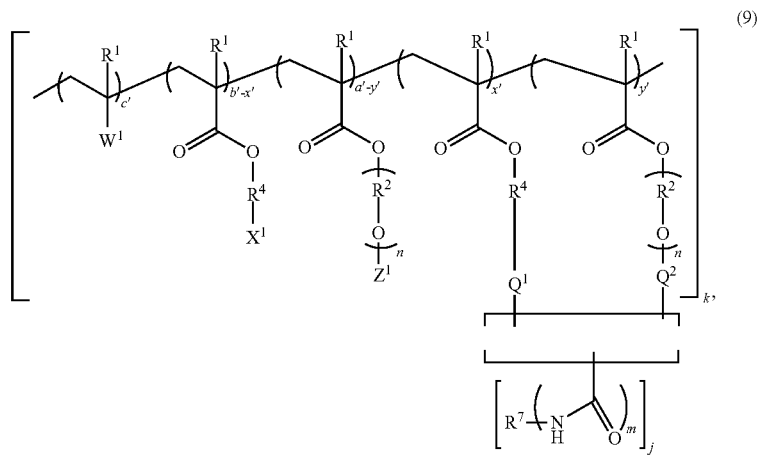

wherein
- n is a positive integer greater than 1,
- a', b', and c' are positive numbers,
- m is a positive integer greater than or equal to 2,
- j represents the average number of bridging groups bound to one poly(meth)acrylate chain, j being greater than or equal to 1,
- k represents the average number of poly(meth)acrylate chains bound to one bridging group, k being greater than or equal to 1, y' is a positive number less than or equal to a', x' is a positive number less than or equal to b', each —$R^1$ is independently a hydrogen or methyl group, —$R^2$— is a divalent radical selected from the group consisting of ethylene, 2-propylene, butylene, and combinations thereof, —$R^4$— is a linear, branched or cyclic divalent radical selected from the group consisting of alkylenes, fluoroalkylenes, arylenes, arylalkylenes, alkylarylenes, and silicon containing groups, $R^7$ is a bridging group having a valency of m and comprising 1 to 10,000 carbons, —$W^1$ is a monovalent radical comprising two or more carbons, —N(H)C(=O)-$Q^1$- is a divalent linking group selected from the group consisting of carbamates, ureas, and thiocarbamates, -$Q^1$- is a divalent radical selected from the group consisting of —O—, —N(H)—, —N($R^5$)—, and —S—, —N(H)C(=O)-$Q^2$- is a divalent linking group selected from the group consisting of carbamates, ureas, and thiocarbamates, -$Q^2$- is a divalent radical selected from the group consisting of —O—, —NH—, —N($R^3$)—, —S—, -$L^1$-O—*, -$L^1$-NH—*, -$L^1$-N($R^3$)—*, and -$L^1$-S—* wherein the starred bond represents the point of attachment to a carbonyl of a linking group, —$Z^1$ is a monovalent radical selected from the group consisting of —H, —$R^3$, -$L^1$-OH, -$L^1$-$NH_2$, -$L^1$-N(H)$R^3$, -$L^1$-N($R^3$)$_2$, -$L^1$-SH, and -$L^1$-S$R^3$, —$R^3$ is a monovalent radical comprising 1 to 20 carbons, -$L^1$- is a divalent radical comprising 1 to 20 carbons, —$X^1$ is a monovalent nucleophilic monovalent radical selected from the group consisting of —OH, —$NH_2$, —N(H)$R^5$, and —SH, and —$R^5$ is a monovalent radical comprising 1 to 20 carbons.

31. The composition of claim 30, wherein —$R^2$— is ethylene, —$Z^1$ is methyl, —$X^1$ is hydroxyl, -$Q^1$- is —O—, x'=b', and m is 3 or more.

32. The composition of claim 30, wherein W' is —$CO_2R^6$, wherein —$R^6$ is a linear, branched or cyclic monovalent radical selected from the group consisting of alkylenes, fluoroalkylenes, arylenes, arylalkylenes, alkylarylenes, and silicon containing groups.

33. A composition, comprising:

a crosslinked poly(meth)acrylate comprising two or more poly(meth)acrylate backbones covalently linked to a bridging group, the backbones comprising i) respective first repeat units, each of which comprises a first side chain ester moiety comprising a hydrophilic poly(alkylene oxide) chain segment, ii) respective second repeat units, each of which comprises a second side chain ester moiety directly linked to the bridging group through a linking group selected from the group consisting of carbamate groups, urea groups, and thiocarbamate groups, and iii) respective third repeat units, each of which comprises a hydrophobic side chain moiety not directly linked to any bridging group;

wherein the bridging group is selected from the group consisting of

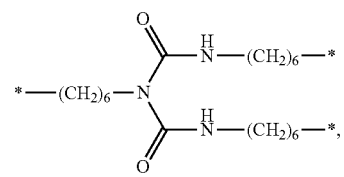

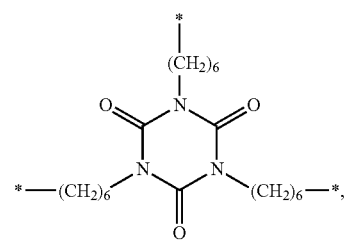

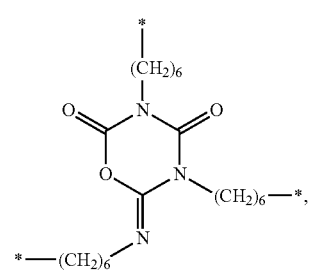

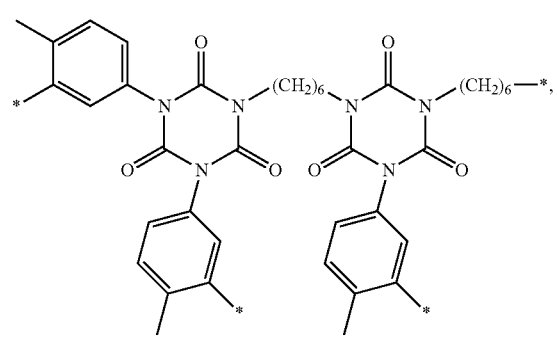

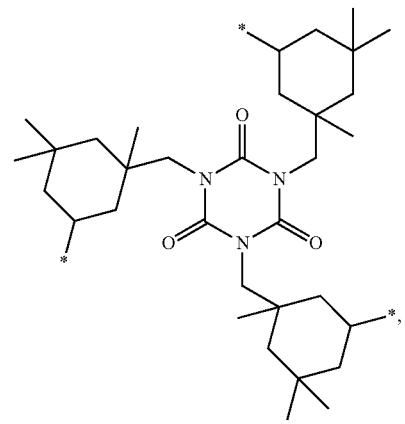

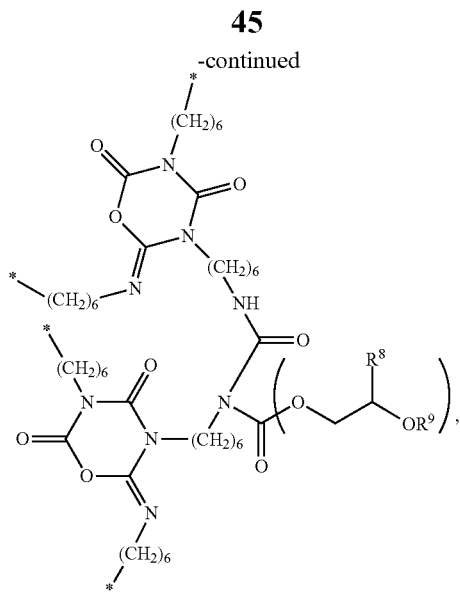

and combinations thereof, wherein —R⁸ and —R⁹ are monovalent radicals comprising one or more carbons.

34. A composition, comprising:
a crosslinked poly(meth)acrylate comprising two or more poly(meth)acrylate backbones; wherein each of the two or more backbones is connected to i) a crosslinked ester side chain moiety, the crosslinked ester side chain moiety being covalently linked to a bridging group by a linking group selected from the group consisting of carbamate groups, urea groups, and thiocarbamate groups, ii) a hydrophilic side chain ester moiety comprising a poly(alkylene oxide) chain segment, and iii) a hydrophobic side chain moiety not directly linked to any bridging group;
wherein the bridging group is selected from the group consisting of

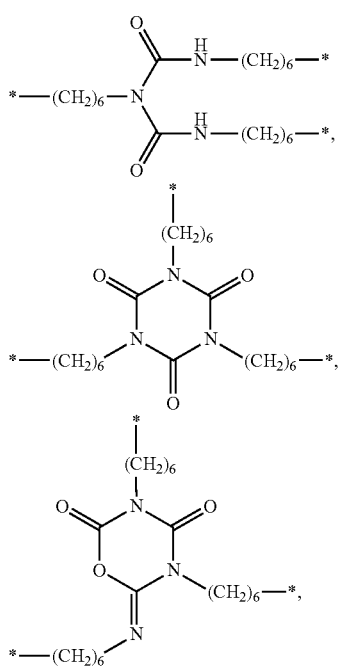

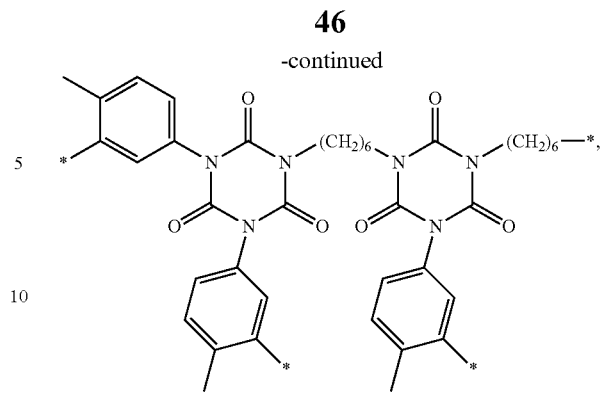

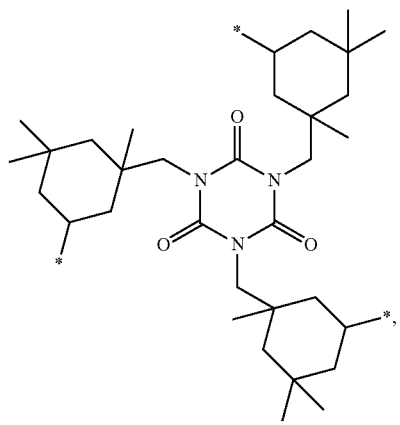

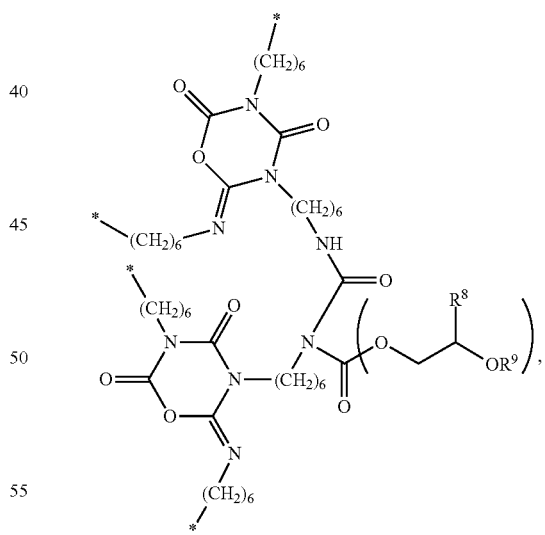

and combinations thereof, wherein —R⁸ and —R⁹ are monovalent radicals comprising one or more carbons.

* * * * *